(12) United States Patent
Schoch et al.

(10) Patent No.: US 11,821,411 B2
(45) Date of Patent: Nov. 21, 2023

(54) ACTUATION SYSTEMS AND METHODS

(71) Applicant: ILLUMINA, INC., San Diego, CA (US)

(72) Inventors: Reto Schoch, Danville, CA (US); Xuance Zhou, Milpitas, CA (US); Tarun Khurana, Fremont, CA (US); Chetanya Jain, Berkeley, CA (US); Gregory Suematsu, Long Beach, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 18/087,274

(22) Filed: Dec. 22, 2022

(65) Prior Publication Data

US 2023/0124278 A1 Apr. 20, 2023

Related U.S. Application Data

(63) Continuation of application No. 17/529,059, filed on Nov. 17, 2021, now Pat. No. 11,555,486.

(60) Provisional application No. 63/116,765, filed on Nov. 20, 2020.

(51) Int. Cl.
*F03G 7/06* (2006.01)

(52) U.S. Cl.
CPC .......... *F03G 7/06143* (2021.08); *F03G 7/066* (2021.08)

(58) Field of Classification Search
CPC .............................. F03G 7/06143; F03G 7/066
See application file for complete search history.

(56) References Cited

U.S. PATENT DOCUMENTS

| | | | |
|---|---|---|---|
| 5,622,413 A * | 4/1997 | Kim | B60T 8/17616 303/119.2 |
| 6,036,107 A | 3/2000 | Aspen et al. | |
| 6,404,098 B1 * | 6/2002 | Kayama | F03G 7/06 310/307 |
| 7,017,345 B2 * | 3/2006 | Von Behrens | F03G 7/065 60/527 |
| 7,256,518 B2 * | 8/2007 | Gummin | F03G 7/065 60/527 |
| 8,555,926 B2 | 10/2013 | MacDuff et al. | |
| 9,127,483 B2 * | 9/2015 | Ac | E05B 47/0009 |
| 9,206,789 B2 * | 12/2015 | Foshansky | F03G 7/065 |
| 2001/0038082 A1 | 11/2001 | Hines et al. | |
| 2002/0016450 A1 | 2/2002 | Laugharn et al. | |
| 2005/0055014 A1 | 3/2005 | Coppeta et al. | |
| 2007/0277877 A1 * | 12/2007 | Ghorbal | F16K 31/002 251/336 |
| 2009/0291507 A1 | 11/2009 | Clemmens et al. | |
| 2015/0352548 A1 | 12/2015 | Deshpande et al. | |

(Continued)

*Primary Examiner* — Shafiq Mian
(74) *Attorney, Agent, or Firm* — MARSHALL, GERSTEIN & BORUN LLP

(57) ABSTRACT

Actuation systems and methods are disclosed. An apparatus includes a system including a flow cell receptacle and a valve drive assembly including a shape memory alloy actuator including a pair of shape memory alloy wires and a flow cell disposable within the flow cell receptacle and having a membrane valve. The system actuates the membrane valve, via the shape memory alloy actuator, by causing a voltage to be applied to a first one of the shape memory alloy wires and the system not applying the voltage to a second one of the shape memory alloy wires.

21 Claims, 35 Drawing Sheets

(56) References Cited

U.S. PATENT DOCUMENTS

| | | |
|---|---|---|
| 2016/0207075 A1 | 7/2016 | Alexander et al. |
| 2019/0293551 A1 | 9/2019 | Bosy et al. |
| 2020/0233004 A1 | 7/2020 | Stone et al. |
| 2022/0163020 A1 | 5/2022 | Schoch et al. |

* cited by examiner

ACTUATION SYSTEMS AND METHODS

RELATED APPLICATION

This application claims the benefit of and priority to U.S. patent application Ser. No. 17/529,059, filed Nov. 17, 2021, which itself claims the benefit of and priority to U.S. Provisional Patent Application No. 63/116,765, filed Nov. 20, 2020, the content of each of which is incorporated by reference herein in its entireties and for all purposes.

BACKGROUND

Fluidic cartridges carrying reagents and a flow cell are sometimes used in connection with fluidic systems. The fluidic cartridge may be fluidically coupled to the flow cell. The fluidic cartridges include fluidic lines through which the reagents flow to the flow cell.

SUMMARY

Shortcomings of the prior art can be overcome and advantages and benefits as described later in this disclosure can be achieved through the provision of actuation systems and methods. Various implementations of the apparatus and methods are described below, and the apparatus and methods, including and excluding the additional implementations enumerated below, in any combination (provided these combinations are not inconsistent), may overcome these shortcomings and achieve the advantages and benefits described herein.

In accordance with a first implementation, an apparatus includes a shape memory alloy actuator assembly having a housing including a pair of lateral sides, each having a first end and a second end and a transverse section coupling the lateral walls. A printed circuit board is coupled to the first end of the housing, an end plate is coupled to the second end of the housing, and a plurality of shape memory alloy actuators are positioned between the printed circuit board and the end plate. Each shape memory alloy actuator includes a pair of wire mounts coupled to opposing sides of the printed circuit board, an actuator rod is positioned between the lateral sides of the housing and includes a wire guide and a shape memory alloy wire coupled to the wire mounts and positioned around the wire guides. Applying a voltage to the shape memory alloy wire retracts the shape memory alloy wire and causes the corresponding actuator rod to move between a first position and a second position.

In accordance with a second implementation, an apparatus includes a system including a flow cell receptacle and a valve drive assembly including a shape memory alloy actuator including a pair of shape memory alloy wires and a flow cell disposable within the flow cell receptacle and having a membrane valve. The system actuates the membrane valve via the shape memory alloy actuator by causing a voltage to be applied to a first one of the shape memory alloy wires and the system not applying the voltage to a second one of the shape memory alloy wires.

In accordance with a third implementation, an apparatus includes a system including a valve drive assembly including plurality of shape memory alloy actuators and a flow cell assembly including a flow cell inlet, a flow cell outlet, a flow cell, and a manifold assembly. The manifold assembly includes a common fluidic line having a first side and a second side. The flow cell is coupled to the common fluidic line, a plurality of reagent fluidic lines are disposed on the second side of the common fluidic line, and a plurality of membrane valves are selectively fluidically couple the common fluidic line and a corresponding one of the plurality of reagent fluidic lines. Each shape memory alloy actuator corresponds to one of the membrane valves and is actuatable to selectively control a flow of reagent between each of the reagent fluidic lines and the common fluidic line.

In accordance with a fourth implementation, an apparatus includes a shape-memory alloy actuator including a guide defining an aperture and including wire mounts. An actuator rod is movable through the aperture and includes a plunger at a distal end, a wire guide, and a spring seat. A spring is positioned between the guide and the spring seat. A shape memory alloy wire is coupled to the wire mounts and is positioned around the wire guide. Applying a voltage to the shape memory alloy wire retracts the shape memory alloy wire and causes the actuator rod to move between a first position and a second position.

In accordance with a fifth implementation an apparatus includes a shape memory alloy actuator assembly including a housing, a printed circuit board, a plurality of shape memory alloy actuators, and an actuator manifold assembly. The housing includes a pair of lateral sides each having a first end and a second end and a transverse section coupling the lateral sides. The printed circuit board is coupled to the first end of the housing and the plurality of shape memory alloy actuators are positioned between the printed circuit board and the second end. Each shape memory alloy actuator includes a pair of wire mounts, an actuator rod, and a shape memory alloy wire. The pair of wire mounts are coupled to opposing sides of the printed circuit board and the actuator rod is positioned between the lateral walls of the housing and includes a wire guide. The actuator rod includes a side port and an end face having a vacuum port and a plunger portion. The side port is fluidically coupled to the vacuum port. The shape memory alloy wire is coupled to the wire mounts and is positioned around the wire guide. The actuator manifold assembly is coupled to the printed circuit board and includes a body and a plurality of pneumatic lines. The body has an outlet port and a plurality of inlet ports and each pneumatic line is coupled between the side ports of the actuator rods and the inlet ports of the actuator manifold assembly. Applying a voltage to the shape memory alloy wire retracts the shape memory alloy wire and causes the corresponding actuator rod to move between a first position and a second position.

In accordance with a sixth implementation, an apparatus includes a system having a flow cell receptacle and a plurality of shape memory alloy actuators.

In accordance with a seventh implementation, a method includes causing a voltage to be applied to a first one of shape memory alloy wires of a shape memory alloy actuator and not applying the voltage to a second one of the shape memory alloy wires of the shape memory alloy actuator. The method also includes responsive to applying the voltage to the first one of the shape memory alloy wires, actuating a membrane valve with the shape memory alloy actuator.

In accordance with an eighth implementation, a method includes sealingly engaging a portion of a membrane of a membrane valve with a vacuum port of an actuator rod of a shape memory alloy actuator and causing a voltage to be applied to a shape memory alloy wire of the shape memory alloy actuator. The method also includes responsive to applying the voltage to the shape memory alloy wire, moving the actuator rod and the portion of the membrane between a first position and a second position.

In further accordance with the foregoing first, second, third, fourth, fifth, a sixth, seventh, and/or eighth implementations, an apparatus and/or method may further comprise or include any one or more of the following:

In an implementation, the apparatus further includes an enclosure surrounding the housing and defining one or more vents positioned to enable air flow (air or gas) across the shape memory alloy wires.

In another implementation, the vents are elongate openings extending relative to one or more of the shape memory alloy wires.

In another implementation, the enclosure has open sides.

In another implementation, the apparatus further includes an air flow assembly to flow air across the shape memory alloy wires.

In another implementation, the air flow assembly includes a fan.

In another implementation, the shape memory alloy actuator assembly is a first shape memory alloy actuator assembly and the apparatus further includes a second shape memory alloy actuator assembly opposing the first shape memory alloy actuator assembly.

In another implementation, each of the plurality of shape memory alloy actuators of the first shape memory alloy actuator assembly apply a pulling force and each of a plurality of shape memory alloy actuators of the second shape memory alloy actuator apply a pushing force.

In another implementation, the pulling force is less than the pushing force.

In another implementation, the apparatus further includes a plurality of biasing elements positioned to bias the actuator rods toward the first position.

In another implementation, the first position is a closed position of an associated valve.

In another implementation, the first position is an open position of an associated valve.

In another implementation, the biasing elements are positioned between the printed circuit board and spring seats of the actuator rods.

In another implementation, the end of each actuator rod defines a biasing rod aperture. A biasing rod is positioned in the corresponding biasing rod apertures and extends toward the biasing element. A bushing is positioned around each biasing rod and is positioned to interact with the corresponding biasing element.

In another implementation, the biasing elements include leaf springs.

In another implementation, the transverse section includes a plurality of lateral guide slots and each actuator rod is positioned in a corresponding lateral guide slot.

In another implementation, the lateral guide slots include first lateral guide slots defined on a first side of the transverse section and second lateral guide slots defined on a second side of the transverse section.

In another implementation, the first lateral guide slots are staggered relative to the second lateral guide slots.

In another implementation, the transverse section defines a plurality of guide rod apertures and each actuator rod includes a guide rod that extends through a corresponding guide rod aperture.

In another implementation, the guide rod apertures are staggered between the lateral sides.

In another implementation, each actuator rod includes a plunger portion arranged to actuate an associated valve.

In another implementation, each actuator rod includes a body, the plunger portion, and one or more lateral guides coupled between the body and the plunger portion.

In another implementation, the one or more lateral guides include a pair of opposing lateral guides.

In another implementation, the end plate defines a plurality of slots positioned to receive the plunger portions.

In another implementation, each actuator rod defines a transverse wire guide through which a corresponding shape memory alloy wire extends.

In another implementation, the transverse wire guide includes a curved surface.

In another implementation, the system includes a counter that counts a number of instances that the system causes the voltage to be applied to the first one of the shape memory alloy wires and the system causes the voltage to be applied to the second one of the shape memory alloy wires and to not be applied to the first one of the shape memory alloy wires when the number of instances satisfies a reference number.

In another implementation, the system tests operability of the first one of the shape memory alloy wires and causes the voltage to be applied to the second one of the shape memory alloy wires and to not be applied to the first one of the shape memory alloy wires when the system identifies the first one of the shape memory alloy wires being inoperable.

In another implementation, the system includes a fan mounted to the system to cool the shape memory alloy wires and spaced from the shape memory alloy actuator to deter vibration from the fan from being imparted to the shape memory alloy actuator.

In another implementation, the fan is operable at a first speed when the flow cell and the associated membrane valve are spaced a first distance from the fan and operable at a second speed when the flow cell and the associated membrane valve are spaced a second distance from the fan.

In another implementation, the membrane valves are volcano valves.

In another implementation, each shape memory alloy actuator includes a plunger, a spring that biases the plunger, and a shape memory alloy wire.

In another implementation, actuating the shape memory alloy actuator includes the system causing a voltage to be applied to the shape memory alloy wire that retracts the plunger against a force of the spring.

In another implementation, each of the shape memory alloy actuators include a pair of shape memory alloy wires and actuating the shape memory alloy actuator includes the system causing a voltage to be applied to a first one of the shape memory alloy wires and the system not applying the voltage to a second one of the shape memory alloy wires.

In another implementation, the shape memory alloy wire is a first shape memory alloy wire and the actuator rod includes a second wire guide. A second shape memory alloy wire is coupled to the wire mounts and is positioned around the second wire guide.

In another implementation, the voltage is applied to the first shape memory alloy wire to actuate the shape-memory alloy actuator when voltage is not applied to the second shape memory alloy wire.

In another implementation, further including applying a voltage to the second shape memory alloy wire when voltage is not applied to the first shape memory alloy wire.

In another implementation, the voltage is not applied to the first shape memory alloy wire after a threshold amount of time, after a threshold number of cycles, or if the first shape memory alloy wire is damaged.

In another implementation, the shape memory alloy wire is a first shape memory alloy wire, the guide is a first guide, and the actuator rod includes a second wire guide. The apparatus also includes a second guide having wire mounts and a second shape memory alloy wire is coupled to the wire mounts of the second guide and positioned around the second wire guide.

In another implementation, further including applying voltage to the first and second wires at substantially the same time.

In another implementation, further including applying voltage to the first and second wires in parallel.

In another implementation, applying the voltage to the first shape memory alloy wire retracts the first shape memory alloy wire and causes the actuator rod to move between the first position and the second position and applying a voltage to the second shape memory alloy wire retracts the second shape memory alloy wire and causes the actuator rod to move between the second position and the first position.

In another implementation, the plurality of shape memory alloy actuators includes a first row of shape memory alloy actuators and a second row of the shape memory alloy actuators, the shape memory alloy actuators of the first row being staggered relative to the shape memory alloy actuators of the second row.

In another implementation, the plurality of shape memory alloy actuators includes first shape memory alloy actuators on a first side of the flow cell receptacle and second shape memory alloy actuators on a second side of the flow cell receptacle.

In another implementation, the first shape memory alloy actuators oppose the second shape memory alloy actuators.

In another implementation, the first shape memory alloy actuators apply a pulling force and the second shape memory alloy actuators apply a pushing force.

In another implementation, the pulling force is less than the pushing force.

In another implementation, the system includes a fan positioned to flow air toward the plurality of shape memory alloy actuators.

In another implementation, the apparatus includes an enclosure surrounding the shape memory alloy wires.

In another implementation, the enclosure has a first enclosure assembly and a second enclosure assembly, each of the first enclosure assembly and the second enclosure assembly has an enclosure body coupled to the housing and has an inlet port assembly.

In another implementation, the inlet port assembly has an inlet port and a diffuser.

In another implementation, the inlet port assembly further includes a pressure homogenizer and a nozzle array. The pressure homogenizer positioned between the nozzle array and the diffuser and the diffuser positioned between the pressure homogenizer and the inlet port.

In another implementation, axes of nozzles of the nozzle array are substantially parallel to an axis of the inlet port.

In another implementation, each shape memory alloy actuator includes a sensor or a target carried by the actuator rod and the housing carries the other of the sensor or the target.

In another implementation, the apparatus includes a flow cell assembly including a flow cell inlet, a flow cell outlet, a flow cell, and a manifold assembly. The manifold assembly includes a common fluidic line, a plurality of reagent fluidic lines, and a plurality of membrane valves. The flow cell is coupled to the common fluidic line and the membrane valves are selectively fluidically couple the common fluidic line and a corresponding one of the plurality of reagent fluidic lines. Each membrane valve has a body and a membrane coupled to a surface of the body. The body includes a valve seat and defines a chamber fluidically coupled to the corresponding reagent fluidic line and covered by a portion of the membrane.

In another implementation, opening the membrane valves includes the vacuum port of the corresponding shape memory actuator sealingly engaging the portion of the membrane and moving between the first position and the second position.

In another implementation, each shape memory alloy actuator includes a sensor or a target carried by the actuator rod and each membrane valve carries the other of the sensor or the target.

In another implementation, responsive to a distance between the sensor and the target being greater than a threshold value, the shape memory alloy actuator causes the actuator rod to move toward the portion of membrane and for the vacuum port of the corresponding shape memory actuator to sealing engage the portion of the membrane.

In another implementation, the chamber and the portion of the membrane have a width greater than a width of the valve seat.

In another implementation, the chamber and the portion of the membrane are squircle shaped.

In another implementation, the chamber and the portion of the membrane are tear-drop shaped.

In another implementation, closing the membrane valves includes the plunger portion of the corresponding shape memory actuator moving the membrane from the second position to the first position and urging the membrane into engagement with the valve seat.

In another implementation, each of the actuator rods includes a second side port and the end face has a second vacuum port. The plunger portion is positioned between the vacuum port and the second vacuum port.

In another implementation, each membrane valve defines a second chamber covered by a second portion of the membrane. The valve seat is positioned between the chamber and the second chamber.

In another implementation, opening the membrane valves includes the second vacuum port of the corresponding shape memory actuator sealingly engaging the second portion of the membrane and moving between the first position and the second position.

In another implementation, the pneumatic lines of the actuator manifold assembly are coupled between a second side port of the actuator rods and corresponding inlet ports of the actuator manifold assembly.

In another implementation, the method includes counting a number of instances that the voltage is applied to the first one of the shape memory alloy wires and causing the voltage to be applied to the second one of the shape memory alloy wires and to not be applied to the first one of the shape memory alloy wires when the number of instances satisfies a reference number.

In another implementation, the method includes testing operability of the first one of the shape memory alloy wires.

In another implementation, the method includes identifying the first one of the shape memory alloy wires being inoperable and causing the voltage to be applied to the second one of the shape memory alloy wires and to not be applied to the first one of the shape memory alloy wires after identifying the first one of the shape memory alloy wires being inoperable.

In another implementation, the method includes cooling the shape memory alloy wires.

In another implementation, the method includes cooling the shape memory alloy wires comprises using a fan.

In another implementation, the method includes deterring vibrations from the fan from being imparted to the shape memory alloy actuator.

In another implementation, the method includes identifying a distance between the actuator rod and a membrane valve being greater than a threshold value and, responsive to the distance between the actuator rod and the membrane valve being greater than the threshold value, causing the actuator rod to move toward the portion of the membrane and for the vacuum port of the shape memory actuator to sealing engage the portion of the membrane.

In another implementation, the method includes closing the membrane valve by moving the portion of the membrane from the second position to the first position using a plunger portion of the actuator rod and urging the portion of the membrane into engagement with a valve seat of the membrane valve.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Figure 1:
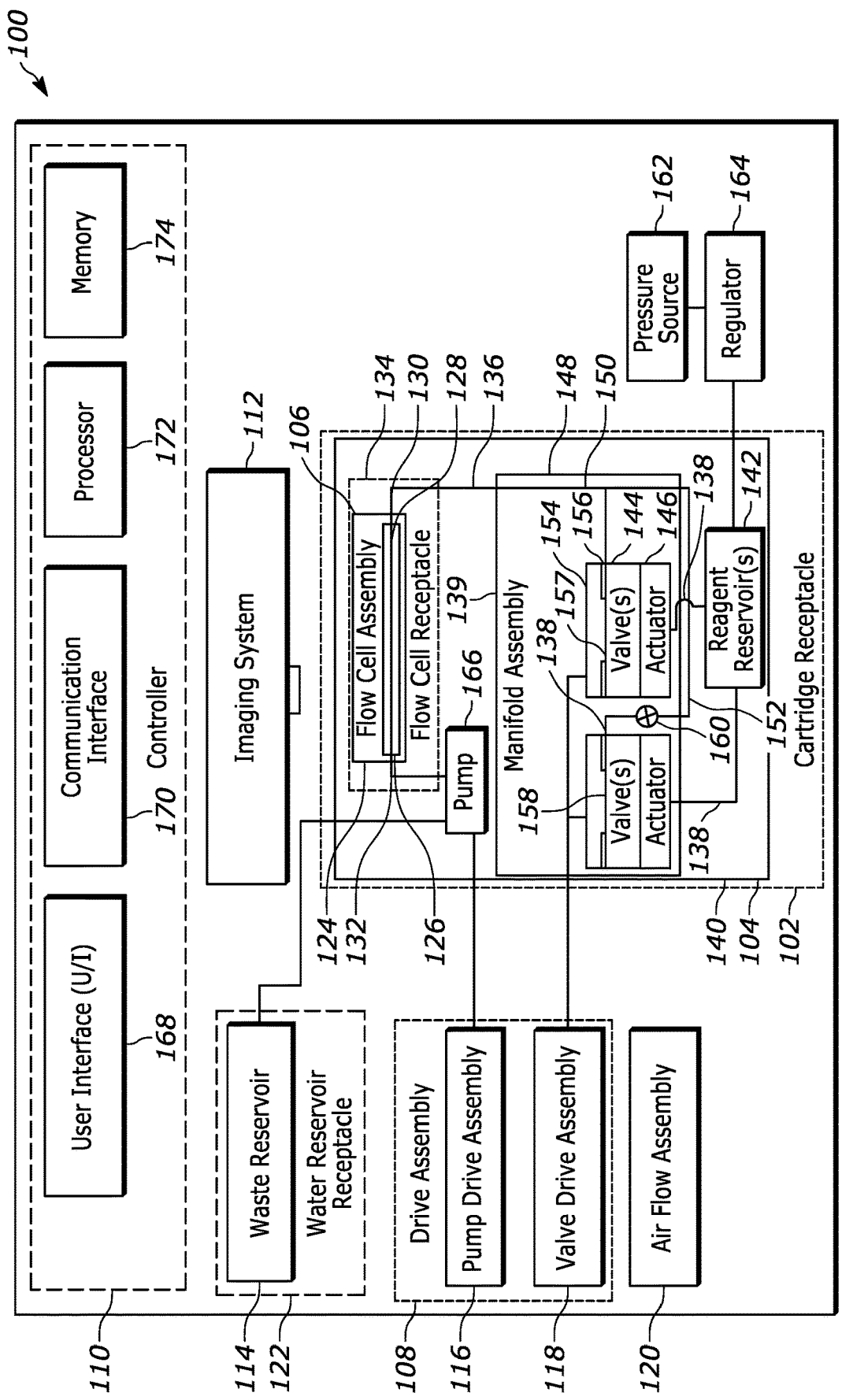
FIG. 1 illustrates a schematic diagram of an implementation of a system in accordance with the teachings of the present disclosure.

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative examples would still fall within the scope of the claims.

It may be advantageous or beneficial to have valve actuators that provide accurate and precise dispensing of small volumes of fluids (for example, liquid reagents), which in some instances may be pressurized, while maintaining a small overall footprint, including width, height, and depth.

This disclosure is directed toward valve drive assemblies of a system (for example, a sequencing system) that interfaces with a reagent cartridge and a flow cell assembly including membrane valves. The system includes a shape memory alloy (SMA) actuator and the membrane valves are part of a manifold assembly. The SMA actuators may be positioned very close to one another on a circuit board—10 millimeters (mm) or less spacing. The use of SMA actuators advantageously allows the membrane valves to be spaced more closely together (minimal footprint), thereby reducing an amount of dead volume within the fluidic network. For example, the SMA actuators as disclosed allow the membrane valves to be spaced in a manner that reduces dead volume between the reagent fluidic lines and a common fluidic line. Less consumables such as reagents may be used as a result. Moreover, by spacing the membranes valves closer together, a length of a common reagent line may be reduced, thereby shortening cycle times and run times of instruments/systems implementing the disclosed examples.

The SMA actuators include a plunger, a spring that biases the plunger, and a SMA wire in some implementations. The SMA actuator is actuated by applying a voltage to the SMA wire, which retracts the SMA wire and the plunger against a force of the spring. In other implementations, the SMA actuators each include a pair of SMA wires, where one of the SMA wires is actuated at a time to increase the useful life of the SMA actuator. The system may actuate the SMA actuator by causing voltage to be applied to a first one of the SMA wires while not applying the voltage to a second one of the SMA wires as an example. If the system identifies that the first one of SMA wires is used a threshold number of times or is no longer operable, the system may actuate the SMA actuator by causing voltage to be applied to the second one of the SMA wires to actuate the SMA actuator while not applying the voltage to the first one of the SMA wires.

FIG. 1 illustrates a schematic diagram of an implementation of a system 100 in accordance with the teachings of the present disclosure. The system 100 can be used to perform an analysis on one or more samples of interest. The sample may include one or more DNA clusters that are linearized to form a single stranded DNA (sstDNA). In the implementation shown, the system 100 includes a reagent cartridge receptacle 102 that can receive a reagent cartridge 104. The reagent cartridge 104 carries a flow cell assembly 106.

The system 100 includes, in part, a drive assembly 108, a controller 110, an imaging system 112, and a waste reservoir 114 in the implementation shown. The drive assembly 108 includes a pump drive assembly 116 and a valve drive assembly 118 and an air flow assembly 120 arranged to flow air over one or more components of the system 100 including, for example, the valve drive assembly 118. The air flow assembly 120 may be mounted to the system 100 in a manner that reduces vibration and may be operated at a first speed when the valve drive assembly 118 is positioned a first distance from the air flow assembly 120 and may be operated at a second speed when the valve drive assembly 118 is positioned a second distance from the air flow assembly 120. The air flow assembly 120 may not be directly mounted to the valve drive assembly 118 as doing so would impart more vibration from the air flow assembly 120 to the valve drive assembly 118.

Referring back to the controller 110, in the implementation shown, the controller 110 is electrically and/or communicatively coupled to the drive assembly 108, the imaging system 112, and the air flow assembly 120 and can cause the drive assembly 108, the imaging system 112, and/or the air flow assembly 120 to perform various functions as disclosed herein. The waste reservoir 114 may be selectively receivable within a waste reservoir receptacle 122 of the system 100. In other implementations, the waste reservoir 114 may be included in the reagent cartridge 104.

The reagent cartridge 104 may carry one or more samples of interest. The drive assembly 108 interfaces with the reagent cartridge 104 to flow one or more reagents (e.g., A, T, G, C nucleotides) that interact with the sample through the reagent cartridge 104 and/or through the flow cell assembly 106.

In an implementation, a reversible terminator is attached to the reagent to allow a single nucleotide to be incorporated by the sstDNA per cycle. In some such implementations, one or more of the nucleotides has a unique fluorescent label that emits a color when excited. The color (or absence thereof) is used to detect the corresponding nucleotide. The imaging system 112 can excite one or more of the identifiable labels (e.g., a fluorescent label) and thereafter obtain image data for the identifiable labels in the implementation shown. The labels may be excited by incident light and/or a laser and the image data may include one or more colors emitted by the respective labels in response to the excitation. The image data (e.g., detection data) may be analyzed by the system 100. The imaging system 112 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 108 interfaces with the reagent cartridge 104 to flow another reaction component (e.g., a reagent) through the reagent cartridge 104 that is thereafter received by the waste reservoir 114 and/or otherwise exhausted by the reagent cartridge 104. The reaction component performs a flushing operation that chemically cleaves the fluorescent label and the reversible terminator from the sstDNA. The sstDNA is then ready for another cycle.

The flow cell assembly 106 includes a housing 124 and a flow cell 126. As used herein, a "flow cell" can include a device having a lid extending over a reaction structure to form a flow channel there between that is in communication with a plurality of reaction sites of the reaction structure, and can include a detection device that detects designated reactions that occur at or proximate to the reaction sites. The flow cell 126 includes at least one channel 128, a flow cell inlet 130, and a flow cell outlet 132. The channel 128 may be U-shaped or may be straight and extend across the flow cell 126. Other configurations of the channel 128 may prove suitable. Each of the channels 128 may have a dedicated flow cell inlet 130 and a dedicated flow cell outlet 132. A single flow cell inlet 130 may alternatively be fluidly coupled to more than one channel 128 via, for example, an inlet manifold. A single flow cell outlet 132 may alternatively be coupled to more than one channel via, for example, an outlet manifold. In an implementation, the flow cell assembly 106 may be formed by a plurality of layers such as, for example, laminate layers. The flow cell 126 and/or the channel 128 may include one or more microstructures or nanostructures in such an implementation. The microstructures may be formed using a nanoimprint lithography pattern or embossing. Other manufacturing techniques may prove suitable. The nanostructures may include wells, pillars, electrodes, gratings, etc.

In the implementation shown, the reagent cartridge 104 includes a flow cell receptacle 134, a common fluidic line 136, a plurality of reagent fluidic lines 138, and a manifold assembly 139. In other implementations, the manifold assembly 139 is part of the flow cell assembly 106 and/or part of the system 100. The reagent cartridge 104 includes a reagent cartridge body 140.

The flow cell receptacle 134 can receive the flow cell assembly 106. The flow cell assembly 106 can alternatively be integrated into the reagent cartridge 104. In such implementations, the flow cell receptacle 134 may not be included or, at least, the flow cell assembly 106 may not be removably receivable within the reagent cartridge 104. The flow cell assembly 106 may in some implementations be separate from the reagent cartridge 104 and receivable in the flow cell receptacle 134 of the system 100.

Each of the reagent fluidic lines 138 can be coupled to a corresponding reagent reservoir 142 that may contain fluid (e.g., reagent and/or another reaction component). The reagent cartridge body 140 may be formed of solid plastic using injection molding techniques and/or additive manufacturing techniques. The reagent reservoirs 142 are integrally formed with the reagent cartridge body 140 in some implementations. The reagent reservoirs 142 are separately formed and are coupled to the reagent cartridge body 140 in other implementations.

In the implementation shown, the manifold assembly 139 includes a plurality of membrane valves 144 and a plurality of actuators 146 disposed within the manifold assembly 139. In other implementations, one or more of the actuators 146 may be excluded. The membrane valves 144 may be rod-flap valves or volcano valves. The manifold assembly 139 fluidically couples the common fluidic line 136 and each of the reagent fluidic lines 138. Each membrane valve 144 is coupled between the common fluidic line 136 and a corresponding reagent fluidic line 138. The actuators 146 may alternatively be omitted.

The valve drive assembly 118 interfaces with the actuators 146 and/or the membrane valves 144 in operation to control a flow of reagent between the reagent fluidic lines 138 and the common fluidic line 136. In some implementations and as further disclosed below, the valve drive assembly 118 includes a plurality of shape memory alloy actuators that are selectively actuatable to control a position of the corresponding actuators 146 and/or membrane valves 144. Shape memory alloy actuators are moved between a first position and a second position (actuated) by applying a voltage to a shape memory alloy wire, which causes the temperature of the wire to increase and for the wire to contract. When the voltage is no longer applied to the wire, the temperature of the wire decreases and the wire relaxes. To increase the rate at which the temperature of the wire decreases, in the implementation shown, the system 100 includes the air flow assembly 120 that flows air over the wires to increase heat dissipation and decrease an amount of time for the wires to move from contracted position to the relaxed position. The air flow assembly 120 can be one or more fans or another source of air such as a pressurized air source (e.g., the pressure source of FIG. 1). A single larger fan may be used or, alternatively, a plurality of smaller fans may be used in some implementations. The air flow assembly 120 may decrease the rate at which the wires cool or relax by approximately 7.3 times. The air flow assembly 120 may flow air over the wires while the system 100 is operating and/or when the shape memory alloy actuators are actuating.

Referring now to the manifold assembly 139, in the implementation shown, the manifold assembly 139 includes a manifold body 148 that may be formed of polypropylene, a cyclic olefin copolymer, a cyclo olefin polymer, and/or other polymers. The manifold body 148 defines a portion 150 of the common fluidic line 136 and a portion 152 of the reagent fluidic lines 138. A membrane 154 is coupled to portions 156 of the manifold body 148 while another portion 157 of the membrane 154 is not coupled to the manifold body 148. The membrane 154 may thus be locally bonded to the manifold body 148 while the portion 157 above a valve seat 158 of the manifold body 148 is not being bonded to the membrane 154 to allow for a fluidic passage to be created. The membrane 154 may be formed of a flat sheet. The membrane 154 may be elastomeric.

The membrane valves 144 are formed by the membrane 154 and the manifold body 148 in the implementation shown. The manifold body 148 includes the valve seat 158 disposed between the portions 156 of the manifold body 148 and the valve seat 158 is not coupled to the membrane 154. The membrane 154 may thus move away from the valve seat 158 to allow fluid to flow across the corresponding membrane valve 144. The actuators 146 may move the membrane 154 away from the valve seat 158 when actuated to allow fluid flow through the corresponding membrane valve 144. Using the actuators 146 may be advantageous when fluid is drawn across the membrane valve 144 using, for example, negative pressure (e.g., a syringe pump). The membrane 154 may move away from the valve seat 158 in other implementations responsive to a positive pressure of reagent allowing for the actuators 146 to be omitted.

To close the membrane valves 144, the valve drive assembly 118 interfaces with the membrane 154 and drives the membrane 154 against the valve seat 158. The valve drive assembly 118 may allow the membrane 154 to move away from the valve seat 158 to open the membrane valves 144. In an implementation where the valve drive assembly 118 includes a plurality of plungers, the plungers may selectively move away from the valve seat 158 to allow the membrane 154 to move away from the valve seat 158. In another implementation, the valve drive assembly 118 includes plungers that are coupled to the membrane 154. The coupling between the plungers and the membrane 154 may be a snap fit connection or a magnetic connection. Other types of couplings may prove suitable. For example, the valve drive assembly 118 may be mechanically linked to the membrane 154.

The manifold assembly 139 includes a shut-off valve 160 in the implementation shown that may interface with the valve drive assembly 118 and may further control the flow between at least one of the reagent fluidic lines 138 and the common fluidic line 136. The shut-off valve 160 may be actuated to the closed position after processes using reagent from a corresponding reagent reservoir 142 are complete, for example. The shut-off valve 160 may be positioned upstream or downstream of a respective membrane valve 144. Such an approach may further deter cross-contamination from occurring between the different reagents. Because there is a reduced likelihood of cross-contamination, less wash buffer may be used.

The system 100 includes a pressure source 162 that may, in some implementations, be used to pressurize the reagent cartridge 104. The reagent, under pressure via the pressure source 162, may be urged through the manifold assembly 139 and toward the flow cell assembly 106. The pressure source 162 may be carried by the reagent cartridge 104 in another implementation. A regulator 164 is positioned between the pressure source 162 and the manifold assembly 139 and regulates a pressure of the gas provided to the manifold assembly 139. The gas may be air, nitrogen, and/or argon. Other gases may prove suitable. Alternatively, the regulator 164 and/or pressure source 162 may not be included.

Referring now to the drive assembly 108, in the implementation shown, the drive assembly 108 includes the pump drive assembly 116 and the valve drive assembly 118. The pump drive assembly 116 can interface with one or more pumps 166 to pump fluid through the reagent cartridge 104. The pump 166 may be implemented by a syringe pump, a peristaltic pump, a diaphragm pump, etc. While the pump 166 may be positioned between the flow cell assembly 106 and the waste reservoir 114 the pump 166 may be positioned upstream of the flow cell assembly 106 or omitted entirely in other implementations.

Referring to the controller 110, in the implementation shown, the controller 110 includes a user interface 168, a communication interface 170, one or more processors 172, and a memory 174 storing instructions executable by the one or more processors 172 to perform various functions including the disclosed implementation. The user interface 168, the communication interface 170, and the memory 174 are electrically and/or communicatively coupled to the one or more processors 172.

In an implementation, the user interface 168 can receive input from a user and to provide information to the user associated with the operation of the system 100 and/or an analysis taking place. The user interface 168 may include a touch screen, a display, a key board, a speaker(s), a mouse, a track ball, and/or a voice recognition system. The touch screen and/or the display may display a graphical user interface (GUI).

In an implementation, the communication interface 170 can enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 172 and/or the system 100 may include one or more of a processor-based system(s) or a microprocessor-based system(s). In some implementations, the one or more processors 172 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 174 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

Figure 2:
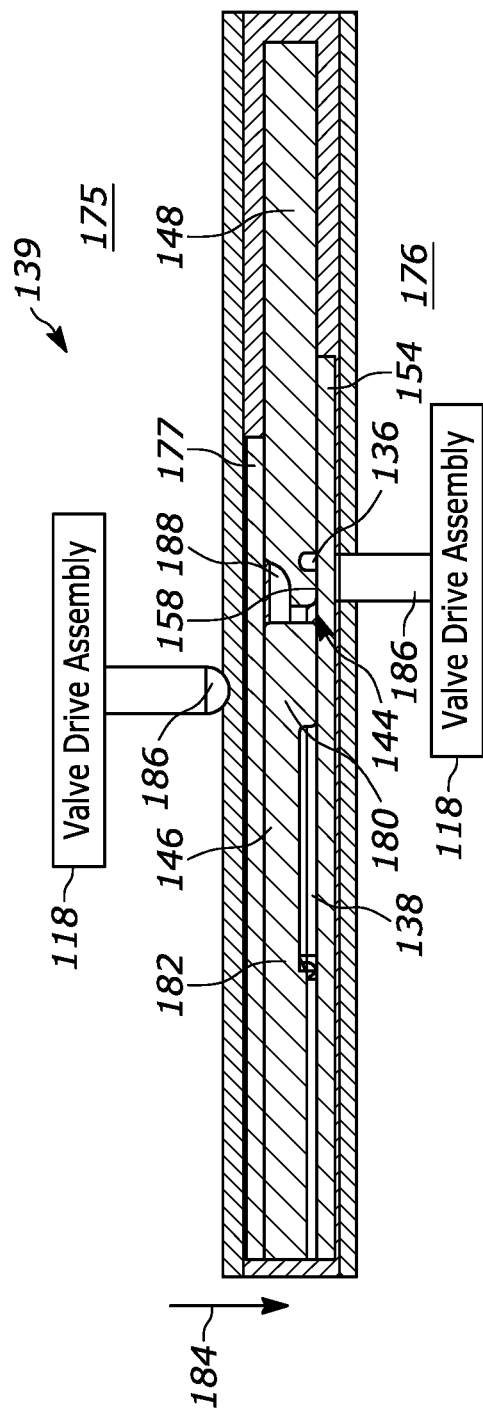
FIG. 2 is a cross-sectional view of an implementation of the manifold assembly of FIG. 1 with the associated valve in the closed position.

FIG. 2 is a cross-sectional view of an implementation of the manifold assembly 139 including the membrane valve 144 and the valve drive assembly 118 of FIG. 1. The membrane valve 144 is a rod flap valve that is in the closed position in the implementation shown and the valve drive assembly 118 includes portions on both sides of the manifold assembly 139. The valve drive assembly 118 thus interfaces with the membrane valve 144 on a first side 175 of the manifold assembly 139 and the actuator 146 on a second side 176 of the manifold assembly 139.

The manifold assembly 139 includes the manifold body 148 and opposing membranes 154, 177 coupled to the manifold body 148 in the implementation shown. The actuator 146 is captured between the opposing membranes 154, 177 that also form a portion of the reagent fluidic line 138. The membranes 154 and/or 177 may have a thickness of approximately 1 millimeter (mm). Other thicknesses however may prove suitable.

The actuator 146 is a cantilever having a distal end 180 movable relative to the membranes 154, 177 and a proximal end 182 coupled to the manifold body 148 in the implementation shown. The manifold body 148 includes a concave cutout 188 adjacent the distal end 180 of the actuator 146 that allows the membrane 177 to be urged, via the valve drive assembly 118, in a direction generally indicated by arrow 184 without putting stress on the membrane 177 in a manner that may damage the membrane 177. The actuator 146 can be actuated in operation, via the valve drive assembly 118, to move the distal end 180 in a direction generally indicated by arrow 184 between an extended position and a retracted position, as shown. The distal end 180 can thus move the membrane 154 away from the corresponding valve seat 158 responsive to being engaged by a valve plunger 186 of the valve drive assembly 118.

The valve drive assembly 118 positioned on the bottom of the manifold assembly 139 relative to the orientation shown in FIG. 2 actuates the membrane valve 144. The membrane valve 144 is shown in the closed position with the valve plunger 186 in the extended position urging the membrane 154 against the valve seat 158.

Figure 3:
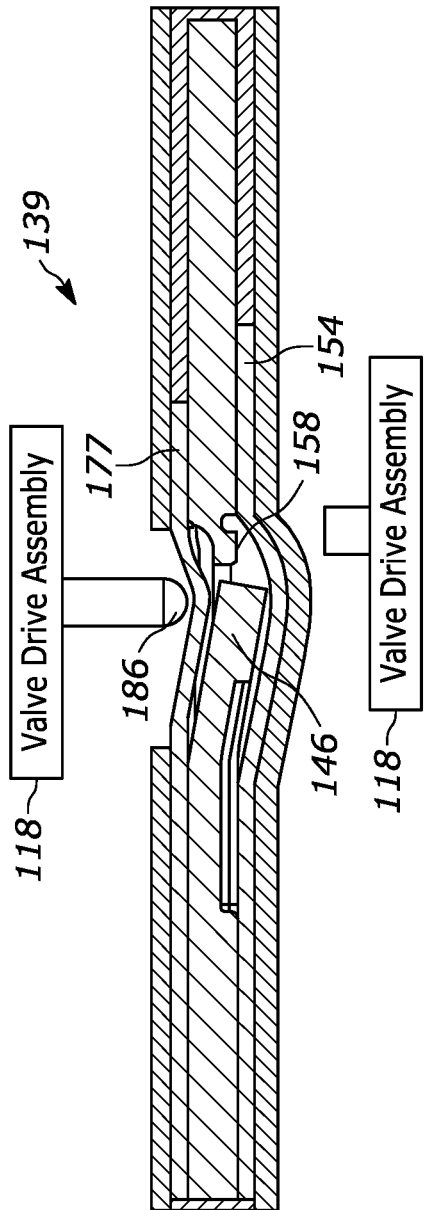
FIG. 3 is a cross-sectional view of the implementation of the manifold assembly of FIG. 2 with the associated valve in the open position.

FIG. 3 is another cross-sectional view of the implementation of the manifold assembly 139 of FIG. 2 with the associated membrane valve 144 in the open position. The valve drive assembly 118 above the manifold assembly 139 as shown interfaces with the membrane 177 to move the actuator 146 and the opposing membrane 154 away from the valve seat 158. The valve drive assembly 118 below the manifold assembly 139 is spaced from the membrane 154 to allow fluid flow between the membrane 154 and the valve seat 158.

Figure 4:
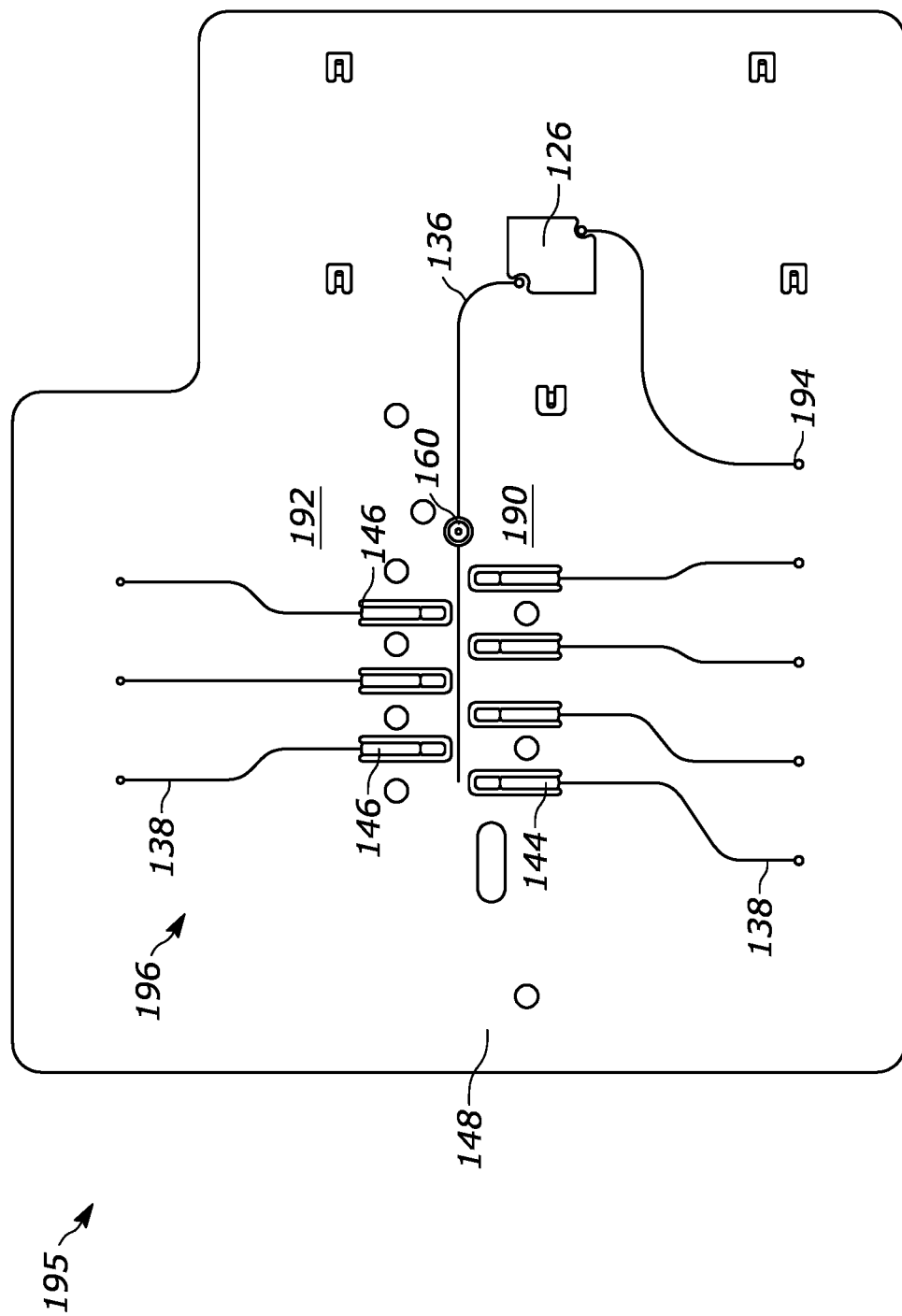
FIG. 4 is a top view of an example implementation of a manifold assembly and a flow cell including membrane valves positioned on a first side of a common reagent fluidic line and membrane valves positioned on a second side of the common fluidic line.

FIG. 4 is a top view of an example flow cell assembly 195 including a manifold assembly 196 and the flow cell 126 that can be used to implement the flow cell assembly 106 of FIG. 1. The flow cell assembly 195 includes the membrane valves 144 positioned on a first side 190 of the common fluidic line 136 and the membrane valves 144 positioned on a second side 192 of the common fluidic line 136. The membrane valves 144 are opened in operation and reagent is flowed to the flow cell 126 and toward an outlet 194 associated with the waste reservoir 114. The membrane valves 144 may be spaced approximately 4 millimeters (mm) apart. For example, the membrane valves 144 on each side of the common reagent fluidic line 136 may be spaced approximately 4 mm apart (a pitch between the centers of the membrane valves 144 of approximately 4 mm), thereby enabling a length of the common fluidic line 136 to be reduced.

Figure 5A:
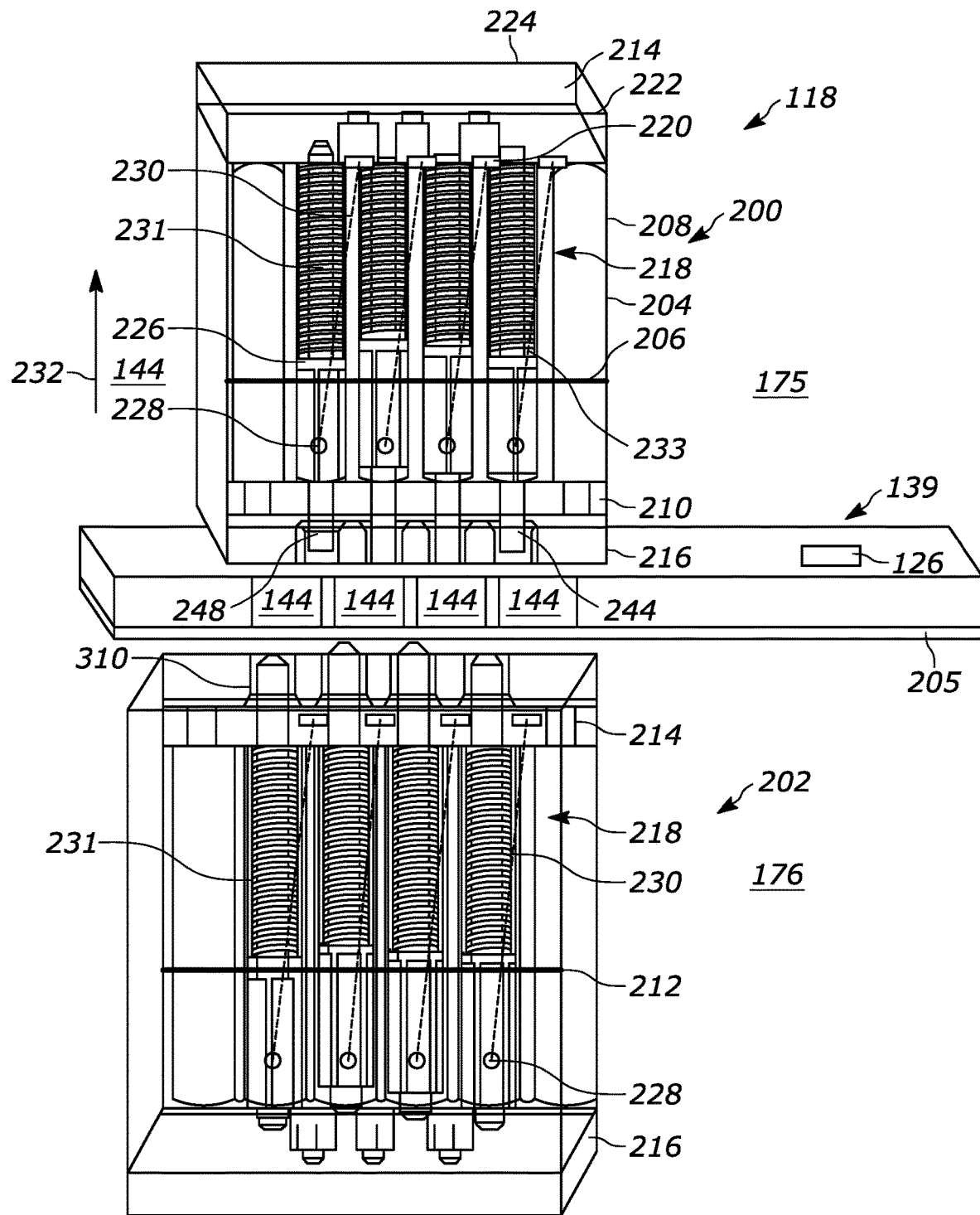
FIG. 5A is an isometric view of an example implementation of the valve drive assembly, the manifold assembly, and the flow cell that can be used to implement the valve drive assembly of FIGS. 1, 2, and 3.

FIG. 5A is an isometric view of an example implementation of the valve drive assembly 118, the manifold assembly 139, and the flow cell 126 that can be used to implement the valve drive assembly 118 of FIGS. 1, 2, and 3. The valve drive assembly 118 includes a first shape memory alloy actuator assembly 200 positioned to interface with the membrane valves 144 on the first side 175 of the manifold assembly 139 and a second shape memory alloy actuator assembly 202 opposing the first actuator assembly 200 and positioned to interface with the manifold assembly 139 on the second side 176 of the manifold assembly 139 in the implementation shown. A backing plate 205 is shown coupled to the manifold assembly 139 that deters the manifold assembly 139 from bending when the membrane valves 144 are being actuated. The first actuator assembly 200 may have a height of approximately 85 millimeters (mm) and the second manifold assembly 202 may have a height of approximately 89 mm. Either of the first and/or second actuator assemblies 200, 202 however may have any suitable height including the same height.

In the implementation shown, the first actuator assembly 200 includes a housing 204 including a pair of lateral sides 206 each having a first end 208 and a second end 210 and a transverse section 212 coupling the lateral sides 206. The housing 204 may be a H-shaped frame and the lateral sides 206 may be lateral walls of the H-shaped frame. While the housing 204 is shown as a frame, the housing 204 may include one or more solid blocks or pieces of material that define actuator rod bores. The first actuator assembly 200 also includes a printed circuit board 214 coupled to the first end 208 of the housing 204 and an end plate 216 coupled to the second end 210 of the housing 204. The end plate 216 of the first actuator assembly 200 is positioned immediately adjacent the manifold assembly 139 and the printed circuit board 214 is spaced from the manifold assembly 139. The end plate 216 of the second actuator assembly 202 in contrast is spaced from the manifold assembly 139 while the printed circuit board 214 is positioned immediately adjacent the manifold assembly 139.

The first actuator assembly 200 also includes a plurality of shape memory alloy actuators 218 positioned between the printed circuit board 214 and the end plate 216. Each actuator 218 includes a pair of wire mounts 220 coupled to opposing sides 222, 224 of the printed circuit board 214 in the implementation shown and an actuator rod 226 positioned between the lateral sides 206 of the housing 204 and including a wire guide 228. The actuators 218 also include a shape memory alloy wire 230 coupled to the wire mounts 220 and positioned through the wire guide 228. The wire 230 may have a 60 um wire diameter and may include an ultra-pure alloy. While each of the first actuator assembly 200 and the second actuator assembly 202 are shown including seven actuators 218, any number of actuators 218 may be included and the first actuator assembly 200 may have the same number of actuators 218 or a different number of actuators 218 than the second actuator assembly 200.

Referring still to the first actuator assembly 200, a plurality of biasing elements 231 are positioned to bias the actuator rods 226 toward the first position. In the implementation shown, the biasing elements 231 are positioned between the printed circuit board 214 and a spring seat 233 of the actuator rods 226 and urge the actuator rods 226 toward the manifold assembly 139, causing the associated membrane valves 144 to close. The biasing elements 231 are shown as coil springs but other types of biasing elements may be used. Belleville washers, torsion springs, leaf springs, etc. may be used, for example. Moreover, while the biasing elements 231 are shown surrounding the actuator rods 226 and seated against the spring seat 233 of the actuator rods 226, the biasing elements 231 may be differently arranged. Ends of the actuator rods 226 may include the spring seat and the biasing elements 231 may be positioned between the printed circuit board 214 and the ends of the actuator rods 226, for example. While the actuator rods 226 of the first actuator assembly 200 are urged toward the manifold assembly 139, the biasing elements 231 of the second actuator assembly 202 are positioned to urge the actuator rods 226 away from the manifold assembly 139, enabling the associated membrane valve 144 to close and/or for the actuator 146 to move to the non-actuated position (See, FIG. 2).

To actuate the actuators 218 of the first actuator assembly 200 in a direction generally indicated by arrow 232 and move the actuator rods 226 away from the associated membrane valves 144, a voltage is applied to the wire 230 that retracts the wire 230 and causes the corresponding actuator rod 226 to move between a first position and a second position. A distance between the first and second positions may be approximately 0.8 millimeters (mm). Different stroke lengths however are achievable. Moreover, using the first and second actuator assemblies 200, 202, the membrane valves 144 can be moved between an open position and a closed position in approximately less than 90 milliseconds. Advantageously and based on the faster cycle times of the membrane valves 144, smaller volumes of reagent such as, for example, approximately 24 µL can be dispensed when the reagent is being moved under positive pressure.

Energizing the wire 230 of the first actuator assembly 200 in some implementations applies a force of approximately 2.4 Newton (N) to the actuators 218 in the direction generally indicated by arrow 232 and energizing the wire 230 of the second actuator assembly 202 applies a force of approximately 3.7 N to the actuators 218 in the direction generally indicated by arrow 232. Other forces however may be achieved. The actuators 218 of the first actuator assembly 200 may be used to urge the membrane 154 against the valve seat 158 and the actuators 218 of the second actuator assembly 202 may be used to move the actuator 146 of the rod-flap valve (see, FIG. 3) of the manifold assembly 139.

In some implementations, pulse width modulation (PWM) is tuned and applied for approximately 45 milliseconds (ms) to, for example, enable the membrane valves 144 to be opened and/or closed relatively rapidly, while reducing vibration. Lesser amounts of power may be applied to the wire 230 in some implementations, causing the wire 230 to move from the first position to the second position more slowly but increasing the rate at which the wire 230 moves from the second position back to the first position (e.g., increased cooling rate). Moreover, different diameter wires 230 may be used to increase or decrease the cooling time of the wire 230 have voltage is applied thereto.

While the above-description describes the first actuator assembly 200, the second actuator assembly 202 has similar structure and can be operated in a similar manner. However, in contrast, applying voltage to the wires 230 of the second actuator assembly 202 moves the actuator rods 226 toward the associated membrane valves 144 and, thus, also in the direction generally indicated by arrow 232. Put another way, actuating the first actuator assembly 200 pulls the actuator rods 226 away from the manifold assembly 139 and actuating the second actuator assembly pushes the actuator rods 226 toward the manifold assembly 139. Moreover, because the actuator rods 226 of second actuator assembly 202 may be used to actuate the actuator 146 captured within the manifold assembly 139, the second actuator assembly 202 may generate a larger amount of force as compared to the amount for force generated by the first actuator assembly 200 to hold the membrane 154 against the valve seat 158.

Figure 5B:
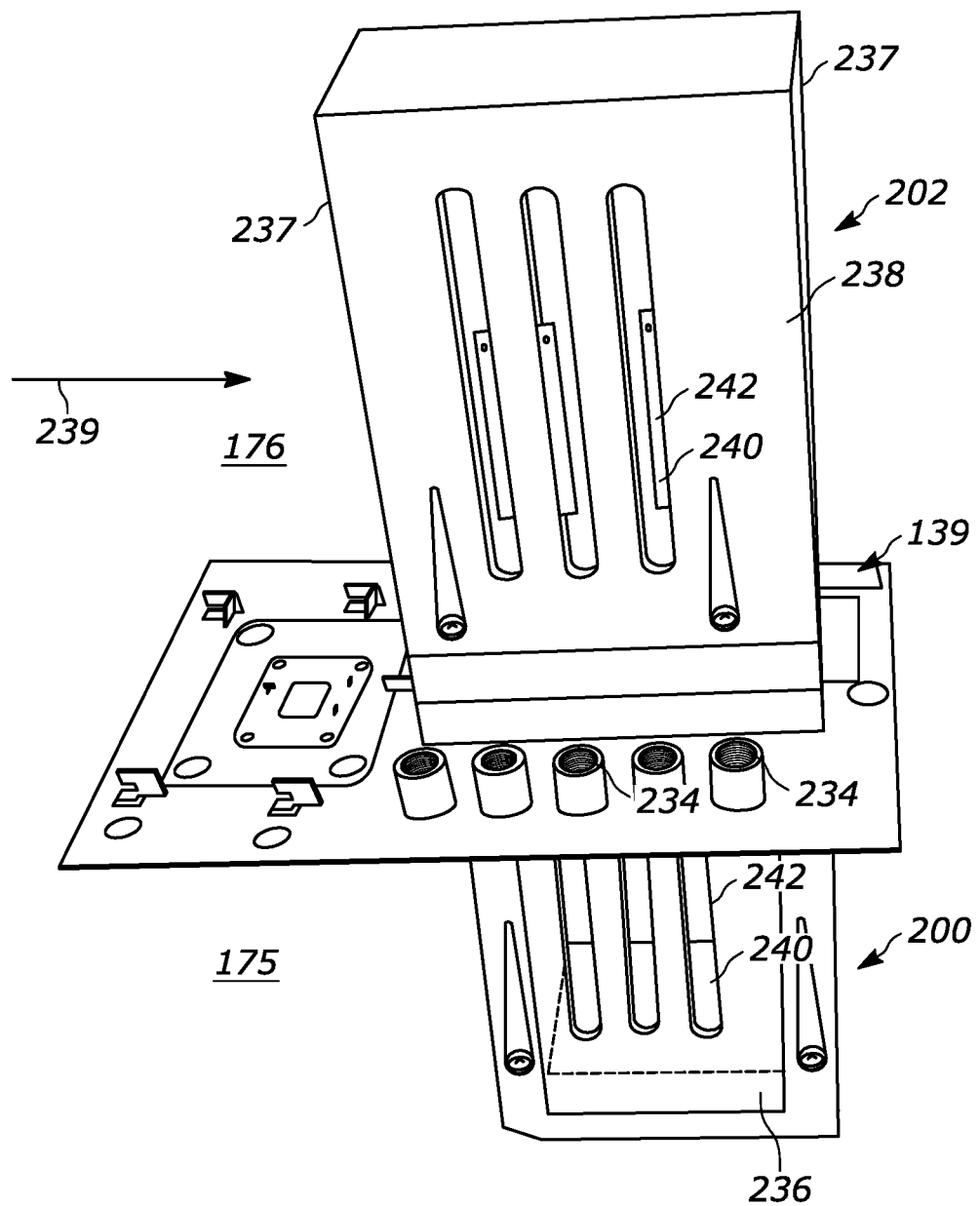
FIG. 5B is another isometric view of the valve drive assembly and the manifold assembly of FIG. 5A.

FIG. 5B is another isometric view of the valve drive assembly 118 and the manifold assembly 139 of FIG. 5A. The manifold assembly 139 is oriented such that ports 234 that are used to flow regent to the reagent fluidic lines 138 are viewable in the implementation shown. FIG. 5B also shows that both the first and second actuator assemblies 200, 202 have an enclosure 236, 238 surrounding the housing 204. The enclosures 236, 238 define one or more vents 240 positioned to enable air flow across the wires 230. The vents 240 may be defined on opposing sides of the enclosures 236, 238 or, more generally, may be defined on one or more sides of the enclosures 236, 238. The vents 240 advantageously concentrate air flowing from, for example, the air flow assembly 120 to more rapidly reduce the temperature of the wires 230 and allow the corresponding actuator 218 to move back to the relaxed position. The vents 240 are shown being elongate openings 242 that extend relative to one or more of the wires 230. The vents 240 however may be any shape and/or any size. Sides 237 of the enclosure 236, 238 may additionally be open. As such, air can flow freely through the enclosures 236, 239 in a direction generally indicated by arrow 239 and through and around a space defined by the wires 230.

Figure 5C:
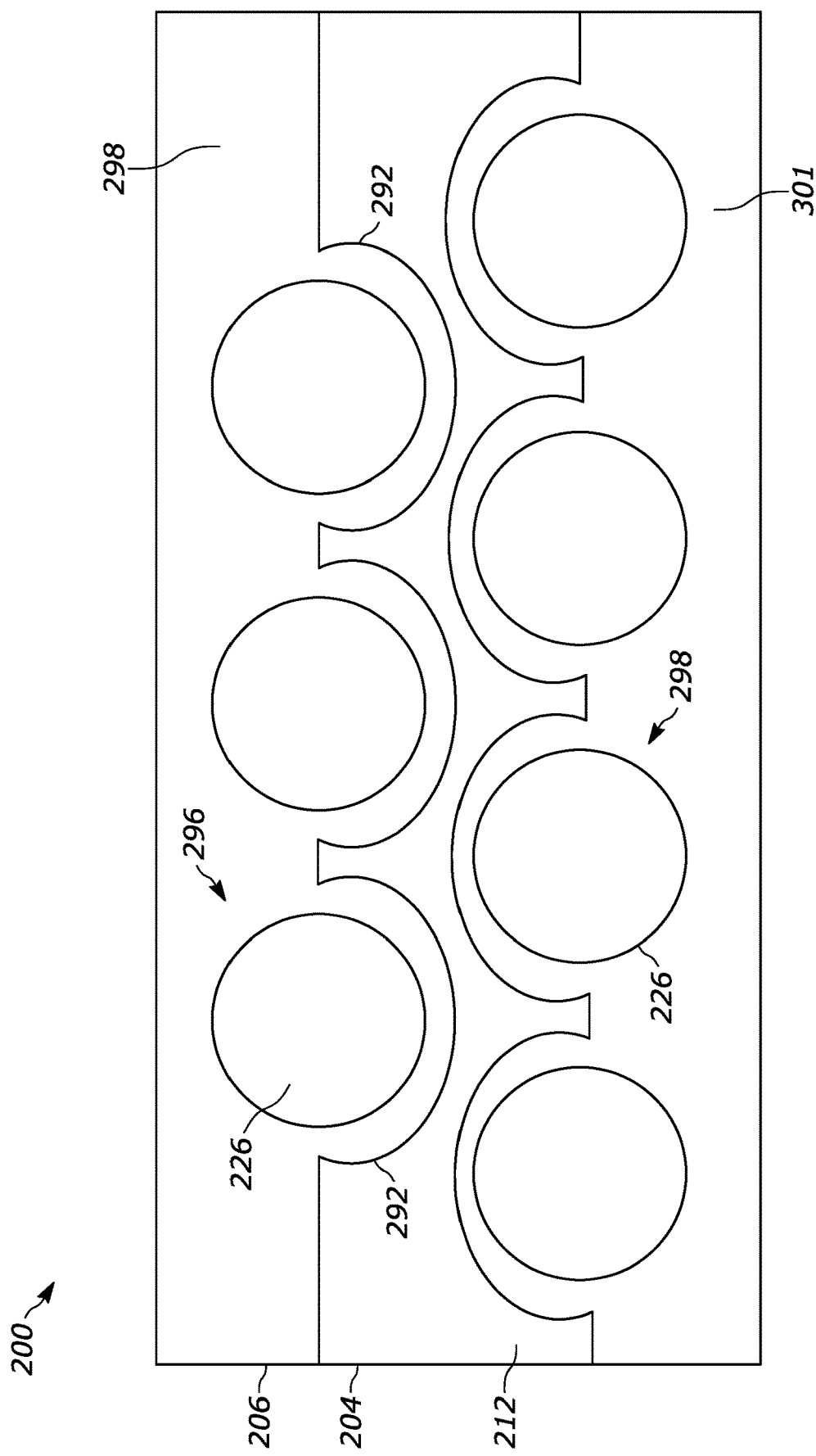
FIG. 5C is a top cross-sectional schematic illustration of the first actuator assembly of FIG. 5A.

FIG. 5C is a top cross-sectional schematic illustration of the first actuator assembly 200 of FIG. 5A. The transverse section 212 includes a plurality of lateral guide slots 292 in the implementation shown and each actuator rod 226 is positioned in a corresponding lateral guide slot 292. First lateral guide slots 296 are defined on a first side 298 of the transverse section 212 and second lateral guide slots 300 are defined on a second side 301 of the transverse section 212. The first lateral guide slots 296 are staggered relative to the second lateral guide slots 300 in the implementation shown to enable the actuator rods 226 to interface with a staggered arrangement of membrane valves 144 such as the valve arrangement shown in FIG. 4.

Figure 6:
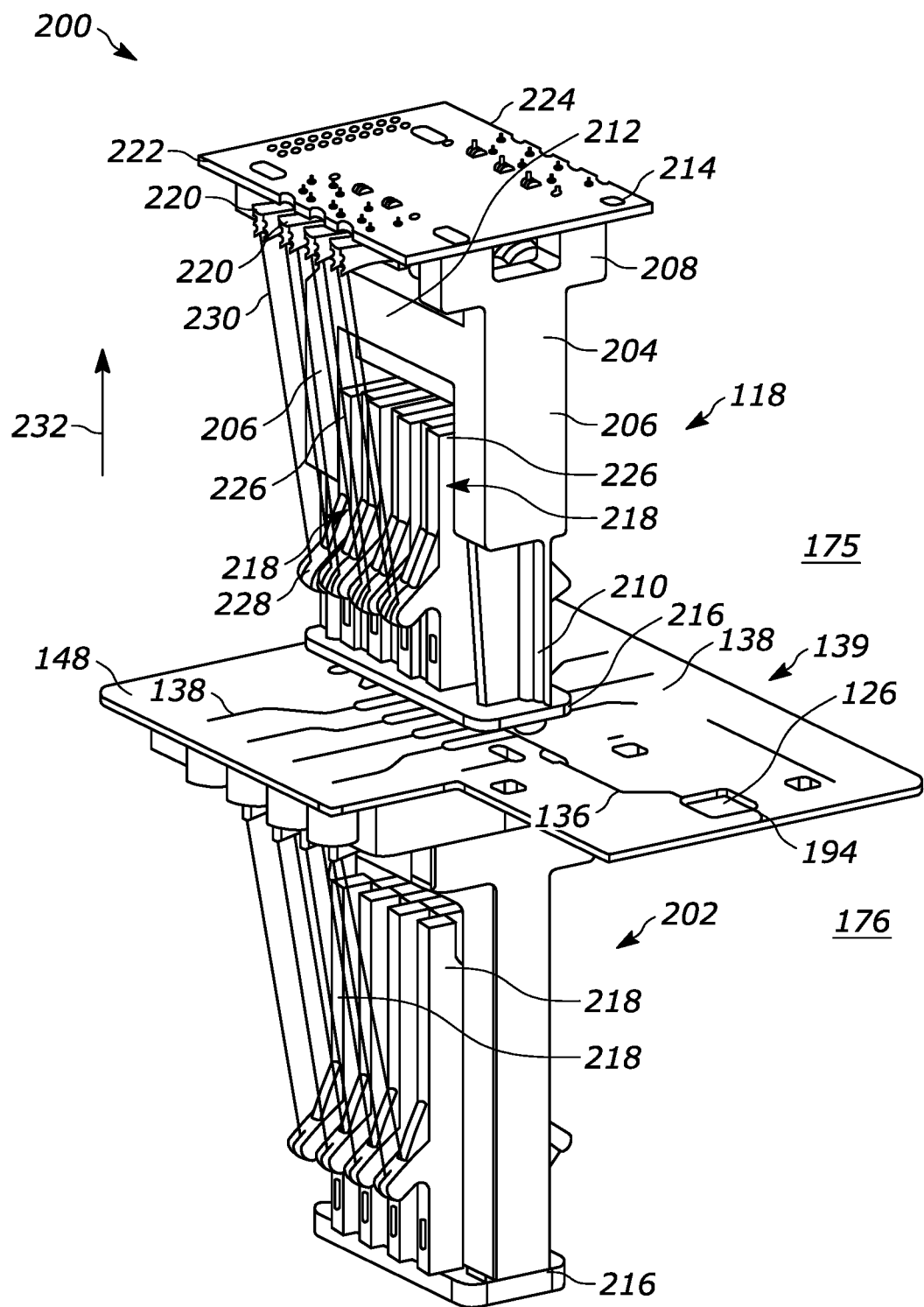
FIG. 6 is an isometric view of another example implementation of the valve drive assembly, the manifold assembly, and the flow cell that can be used to implement the valve drive assembly of FIGS. 1, 2, and 3.

FIG. 6 is an isometric view of another example implementation of the valve drive assembly 118, the manifold assembly 139, and the flow cell 126 that can be used to implement the valve drive assembly 118 of FIGS. 1, 2, and 3. The valve drive assembly 118 of FIG. 6 is similar to the valve drive assembly 118 of FIG. 5A. However, in contrast, the actuator rods 226 of the valve drive assembly 118 of FIG. 6 include a pair of lateral wire guides 228.

Figure 7:
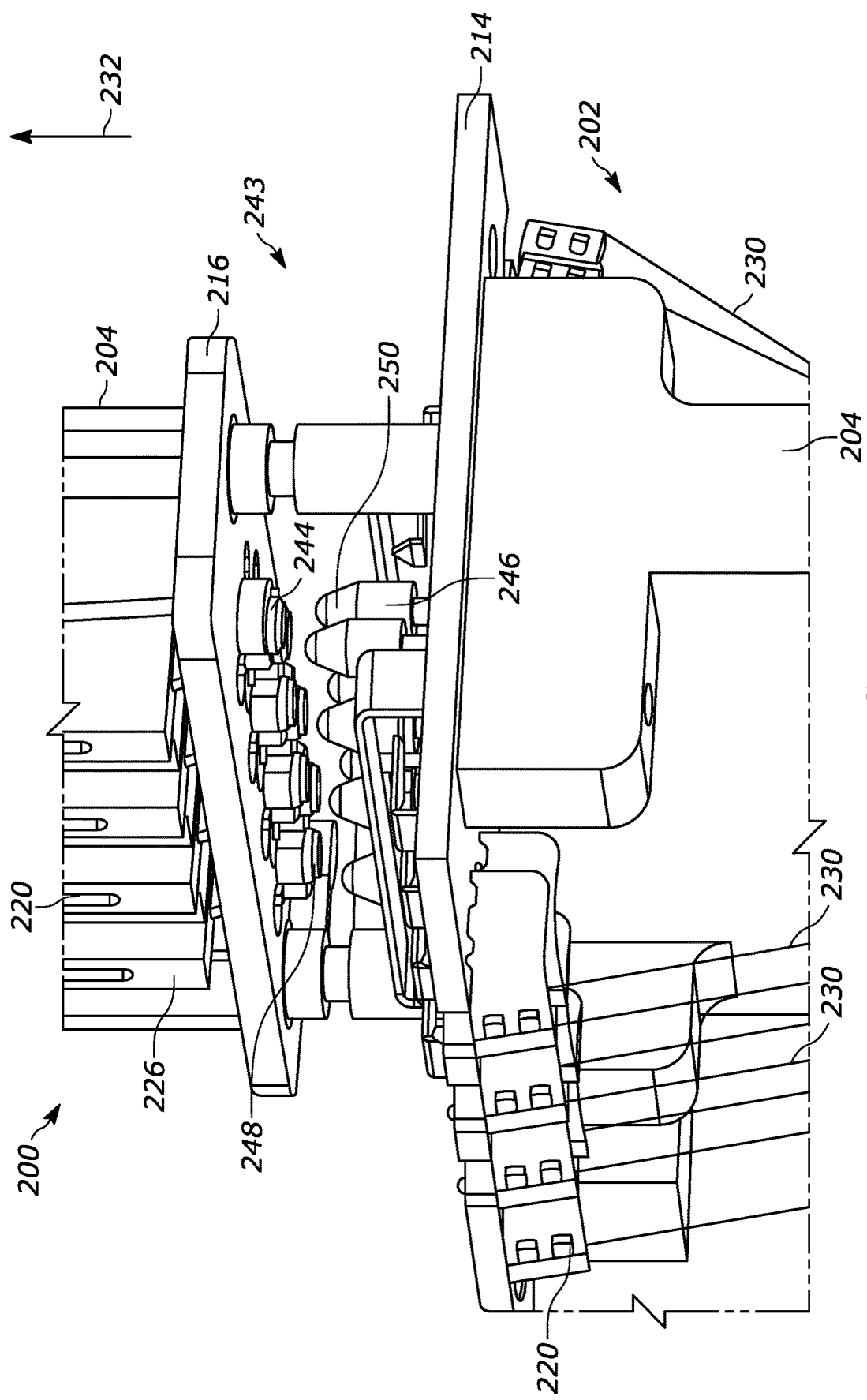
FIG. 7 is an isometric detailed view of an interface between the first actuator assembly and the second actuator assembly of FIG. 6.

FIG. 7 is an isometric detailed view of an interface 243 between the first actuator assembly 200 and the second actuator assembly 202 of FIG. 6. The actuator rods 226 include plunger portions 244, 246, with the plunger portions 244 of the first actuator assembly 200 having flat ends 248 and the plunger portions 246 of the second actuator assembly 202 having rounded ends 250 in the implementation shown.

Figure 8A:
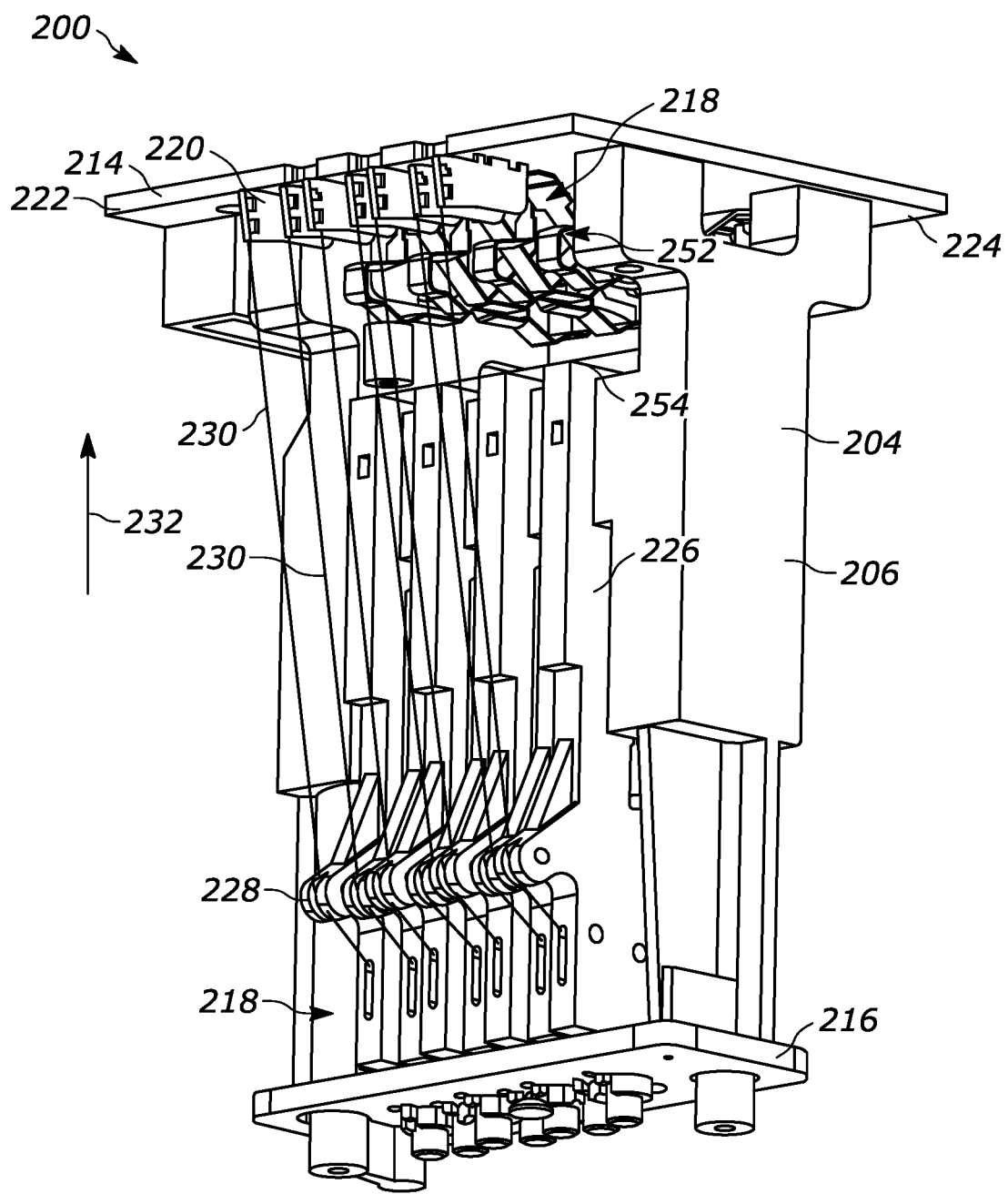
FIG. 8A is an isometric view of the first actuator assembly of FIG. 6 showing a plurality of biasing elements positioned to bias the actuator rods toward the first position.

FIG. 8A is an isometric view of the first actuator assembly 200 of FIG. 6 showing a plurality of switches 252 positioned to be tripped when the actuator rods 226 are in the second position. When one of the switches 252 is tripped, further flow of electricity to the corresponding wire 230 is reduced allowing the wire 230 to stay in the second position, but at a reduced temperature than before. In turn, this enables the wire 230 to return to the first position faster once the first position is commanded (otherwise the temperature difference (delta) from the first position to the second position would be higher due to higher electricity flow, thereby hindering quickly switching from position one to position two). In the implementation shown, the switches 252 are positioned between the printed circuit board 214 and ends 254 of the actuator rods 226.

Figure 8B:
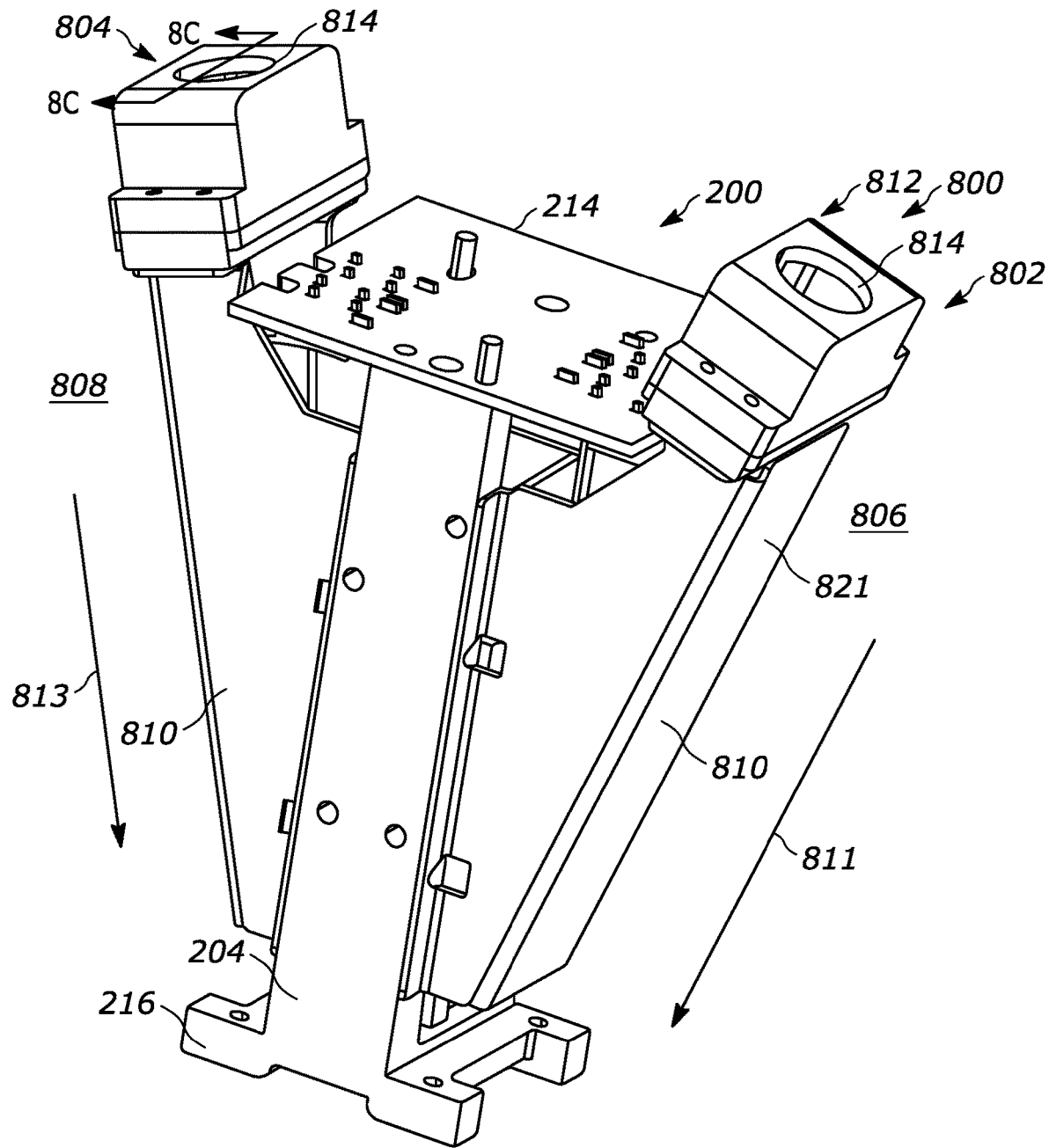
FIG. 8B shows an enclosure surrounding the wires of the actuator assembly of FIG. 6.

FIG. 8B shows an enclosure 800 surrounding the wires 230 of the first actuator assembly 200 of FIG. 6. The enclosure 800 has a first enclosure assembly 802 positioned on a first side 806 of the housing 204 and a second enclosure assembly 804 positioned on a second side 808 of the housing 204. Each of the enclosure assemblies 802, 804 has an enclosure body 810 coupled to the housing 204 and has an inlet port assembly 812. The enclosure bodies 810 taper from the inlet port assemblies 812 toward the end plate 216 of the housing 204, thereby directing the flow of fluid (e.g., air or gas) in a direction generally indicated by arrows 811, 813. As shown, the end plate 216 is a flange that is integral with the housing 204. The end plate 216 may alternatively be coupled to the housing 204.

The inlet port assemblies 812 each have an inlet port 814 in the implementation shown that may be fluidly coupled to the air flow assembly 120 that flows fluid into the inlet port 814 and over the wires 230 to increase heat dissipation. Flowing fluid over the wires 230 also decreases an amount of time for the wires 230 to move from the contracted position to the relaxed position, by, for example, 50% or, more specifically, to about 33.7 milliseconds (ms), 48.4 ms, 54.4 ms, 56.0 ms The inlet port assemblies 812 homogenizes the flow within the enclosures assemblies 802 and/or 804 and/or homogenizes the pressure within the enclosure assemblies 802, 804.

Figure 8C:
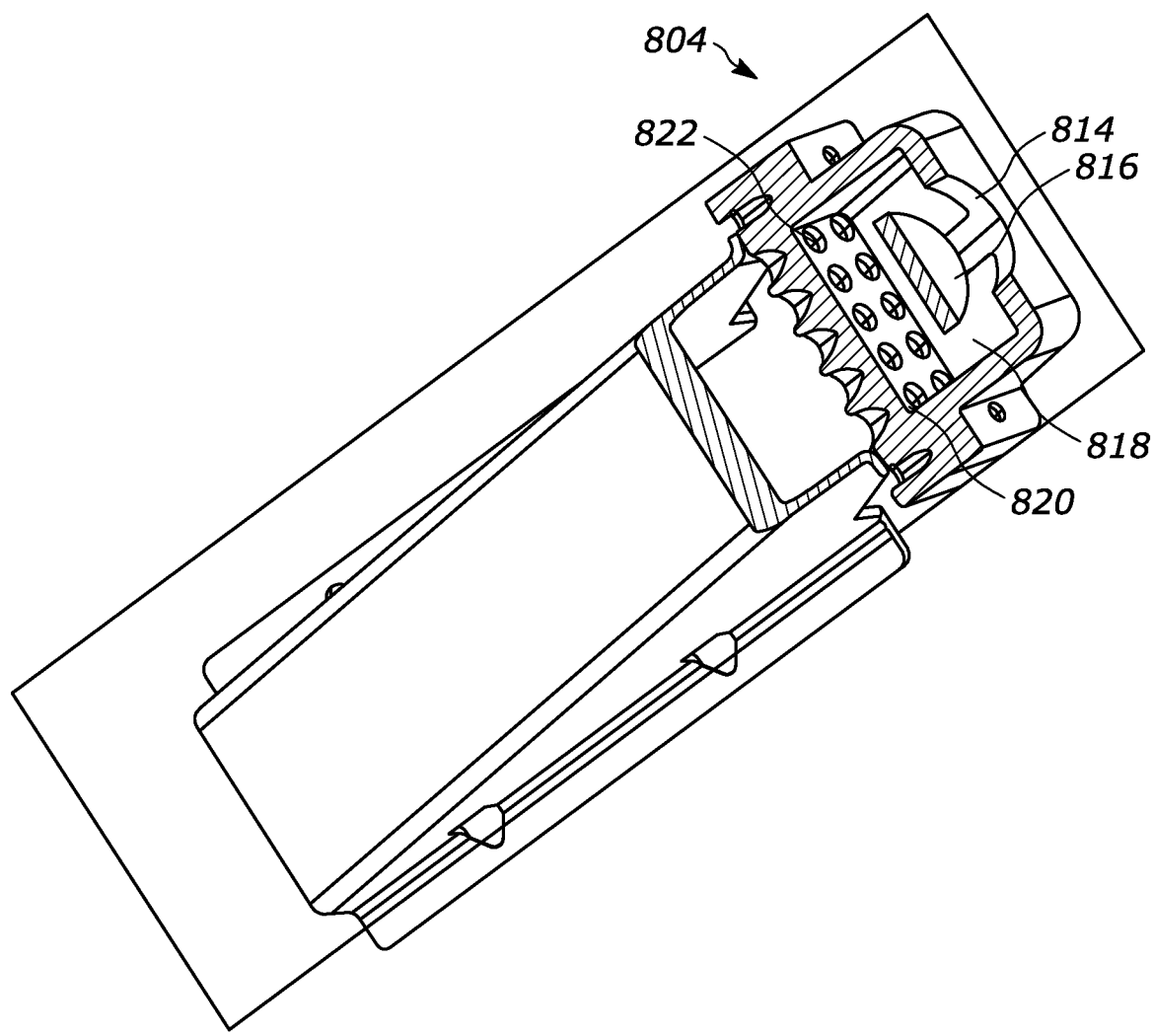
FIG. 8C shows a partial cross-sectional view of the second enclosure assembly of the enclosure of FIG. 8B taken along line 8C-8C of FIG. 8B.

FIG. 8C shows a partial cross-sectional view of the second enclosure assembly 804 taken along line 8C-8C of FIG. 8B. The second enclosure assembly 804 includes the inlet port 814, a diffuser 816, a pressure homogenizer 818, and a nozzle array 820 having a plurality of nozzles 822. The nozzle array 820 is a rectangular array including 15 nozzles 822. One or more of the nozzles 822 (two of the nozzles 802) may be adjacent to an external side 821 of the second enclosure assembly 804 and spaced from the A different number and/or a different arrangement of nozzles 822 may be included.

The pressure homogenizer 818 is positioned between the nozzle array 820 and the diffuser 816 and the diffuser 816 is positioned between the pressure homogenizer 818 and the inlet port 814 and axes of nozzles 822 of are shown substantially parallel to an axis of the inlet port 814. The axis of the inlet port 814 may alternatively be at an angle such as substantially perpendicular to the axes of the nozzles 822. The axes of the nozzles 822 and the axis of the inlet port 814 may be differently arranged. As set forth herein, substantially parallel means about 5° of parallel including parallel itself and substantially perpendicular means about 5° of perpendicular including perpendicular itself.

Figure 9:
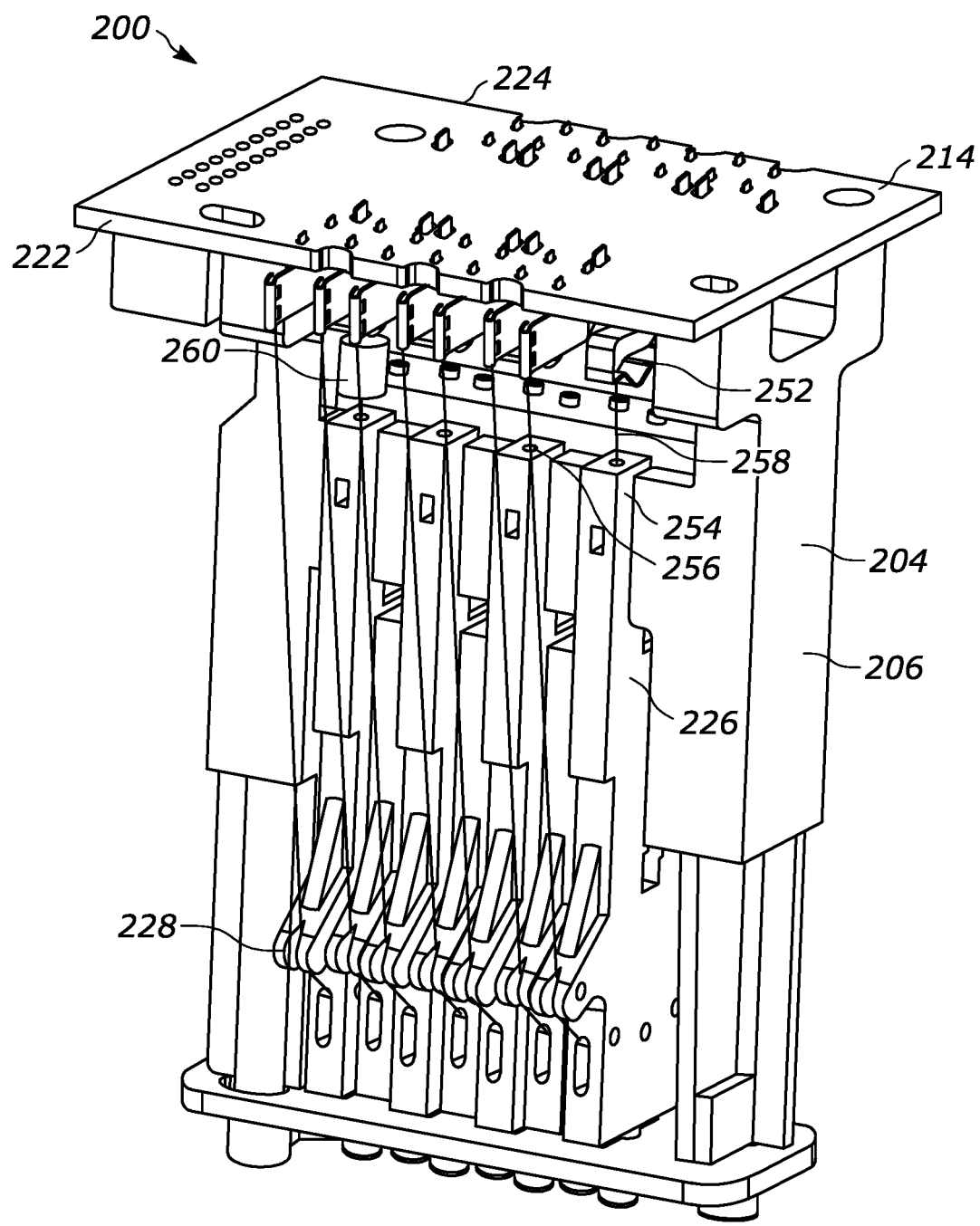
FIG. 9 is an isometric view of the first actuator assembly of FIG. 6.

FIG. 9 is an isometric view of the first actuator assembly 200 of FIG. 6. The ends 254 of each actuator rod 226 define a rod aperture 256 in the implementation shown. A rod 258 is positioned in a corresponding rod aperture 256 and extends toward the switch 252. The rod aperture 256 may be a blind bore such that the rod 258 can move the switch 252 toward the printed circuit board 214. A bushing 260 may be positioned around each rod 258 and positioned to interact with the corresponding switch 252. In such examples, the rod 258 can be used to retain the position of the bushing 260 relative to the actuator rod 226 and the bushing 260 can be used to transfer the force of the switch 252 to the actuator rod 226.

Figure 10:
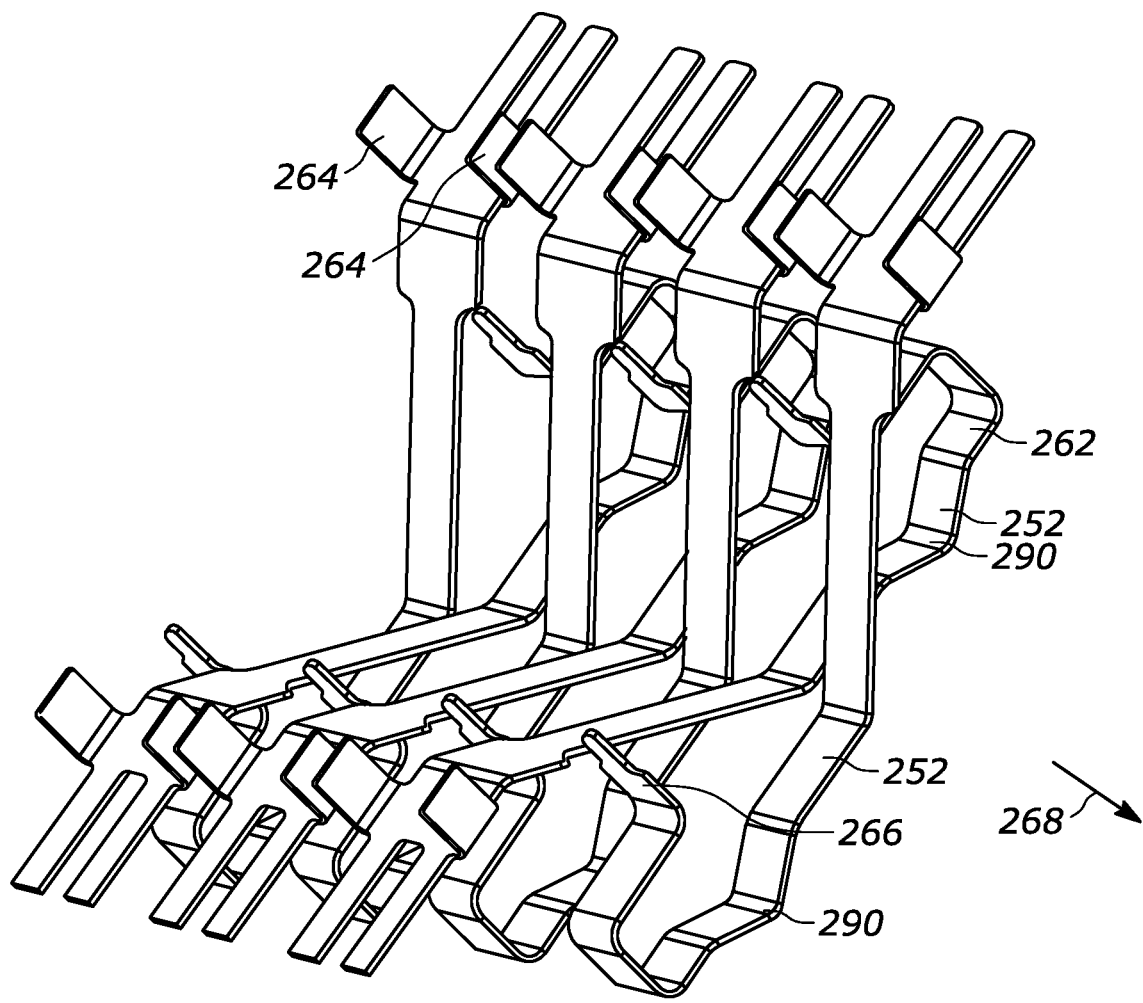
FIG. 10 is an isometric view of a plurality of the biasing elements of the first actuator assembly of FIG. 6.

FIG. 10 is an isometric view of a plurality of the switches 252 of the first actuator assembly 200 of FIG. 6. The switches 252 are leaf springs 262 having a pair of prongs 264 that can be used to couple the switches 252 to the printed circuit board 214 in the implementation shown. An end 266 of the leaf springs 262 are positioned to engage a contact of the printed circuit board 214 and cause the corresponding switch 252 to be tripped. The position of the leaf springs 262 is based on the corresponding position of the actuator rods 226. An engagement portion 290 of some of the leaf springs 262 are thus arranged to be positioned adjacent (e.g., beneath) the first side 222 of the printed circuit board 214 and the engagement portion 290 of others of the leaf springs 262 are arranged to be positioned relatively adjacent the second side 224 of the printed circuit board 214.

Figure 11:
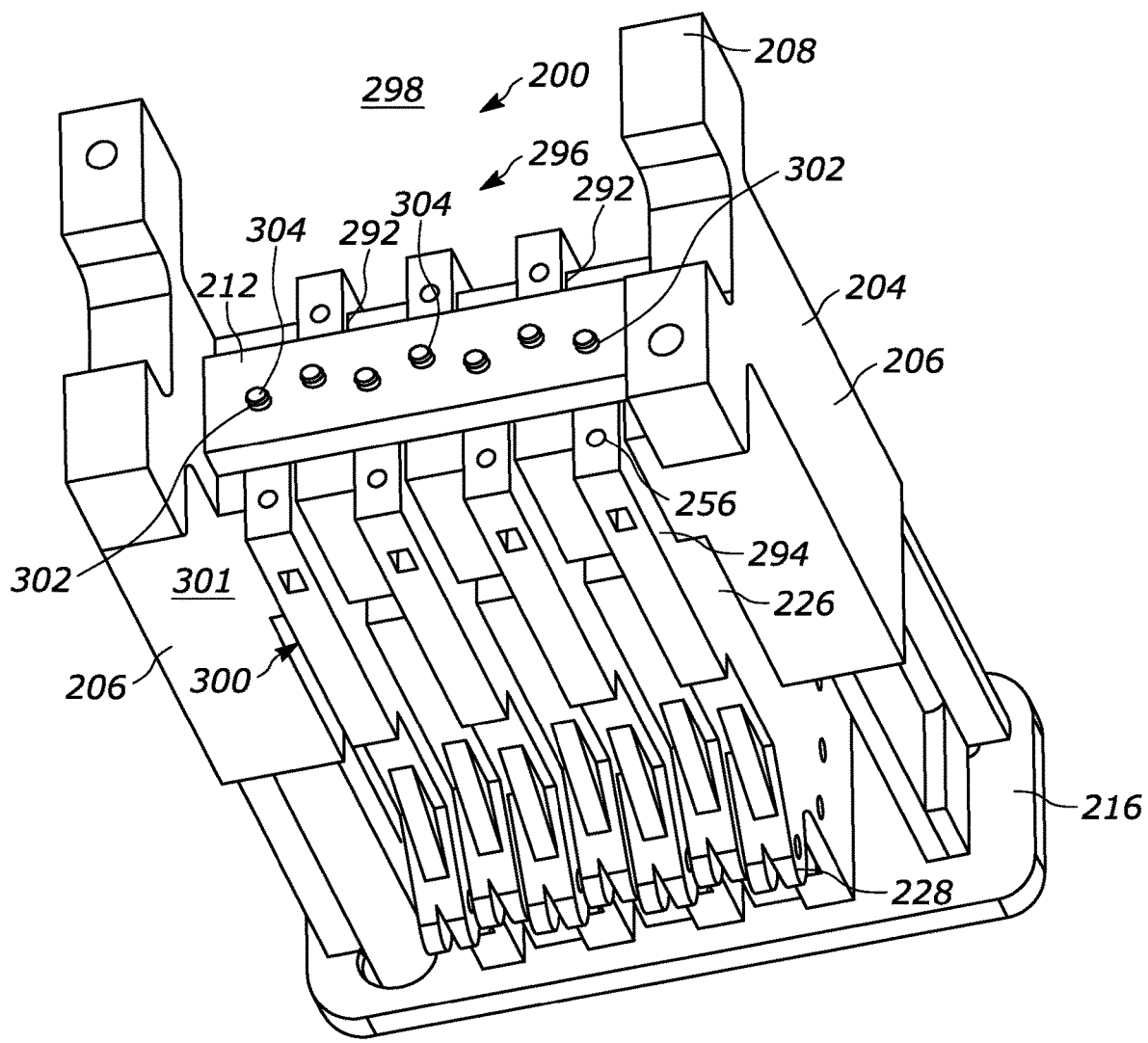
FIG. 11 is an isometric view of the housing and the actuator rods of the first actuator assembly of FIG. 6.

FIG. 11 is an isometric view of the housing 204 and the actuator rods 226 of the first actuator assembly 200 of FIG. 6. The transverse section 212 includes a plurality of lateral guide slots 292 in the implementation shown and each actuator rod 226 has a leg 294 positioned in a corresponding lateral guide slot 292, where first lateral guide slots 296 are defined on a first side 298 of the transverse section 212 and second lateral guide slots 300 are defined on a second side 301 of the transverse section 212. The first lateral guide slots 296 are staggered relative to the second lateral guide slots 300 in the implementation shown. The transverse section 212 defines a plurality of guide rod apertures 302 and each actuator rod 226 includes a guide rod 304 that extends through a corresponding guide rod aperture 302. Interaction between the guide rod 304 and the surface of the transverse section 212 defining the guide rod apertures 302 guides the relative movement of the actuator rod 226. The guide rod apertures 302 are staggered between the lateral sides 206.

Figure 12:
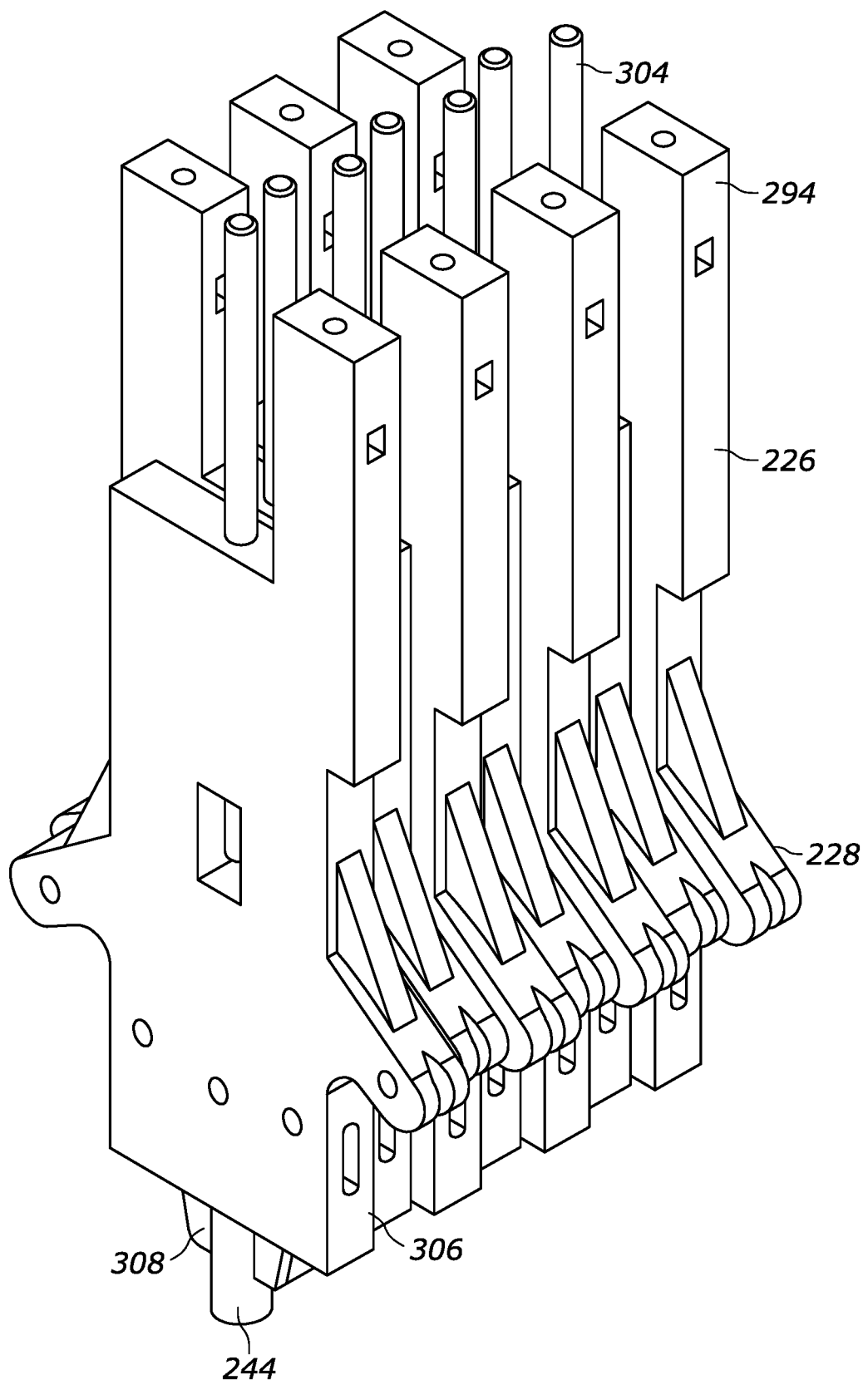
FIG. 12 is an isometric view of the actuator rods of the first actuator assembly of FIG. 6.

FIG. 12 is an isometric view of the actuator rods 226 of the first actuator assembly 200 of FIG. 6. Each of the actuator rods 226 includes a body 306, the plunger portion 244, and one or more lateral guides 308 coupled between the body 306 and the plunger portion 244 in the implementation shown. The lateral guide 308 of FIG. 12 includes a pair of opposing lateral guides 308 that are sized to be received by corresponding slots 310 (See, FIG. 13) defined by the end plate 216.

Figure 13:
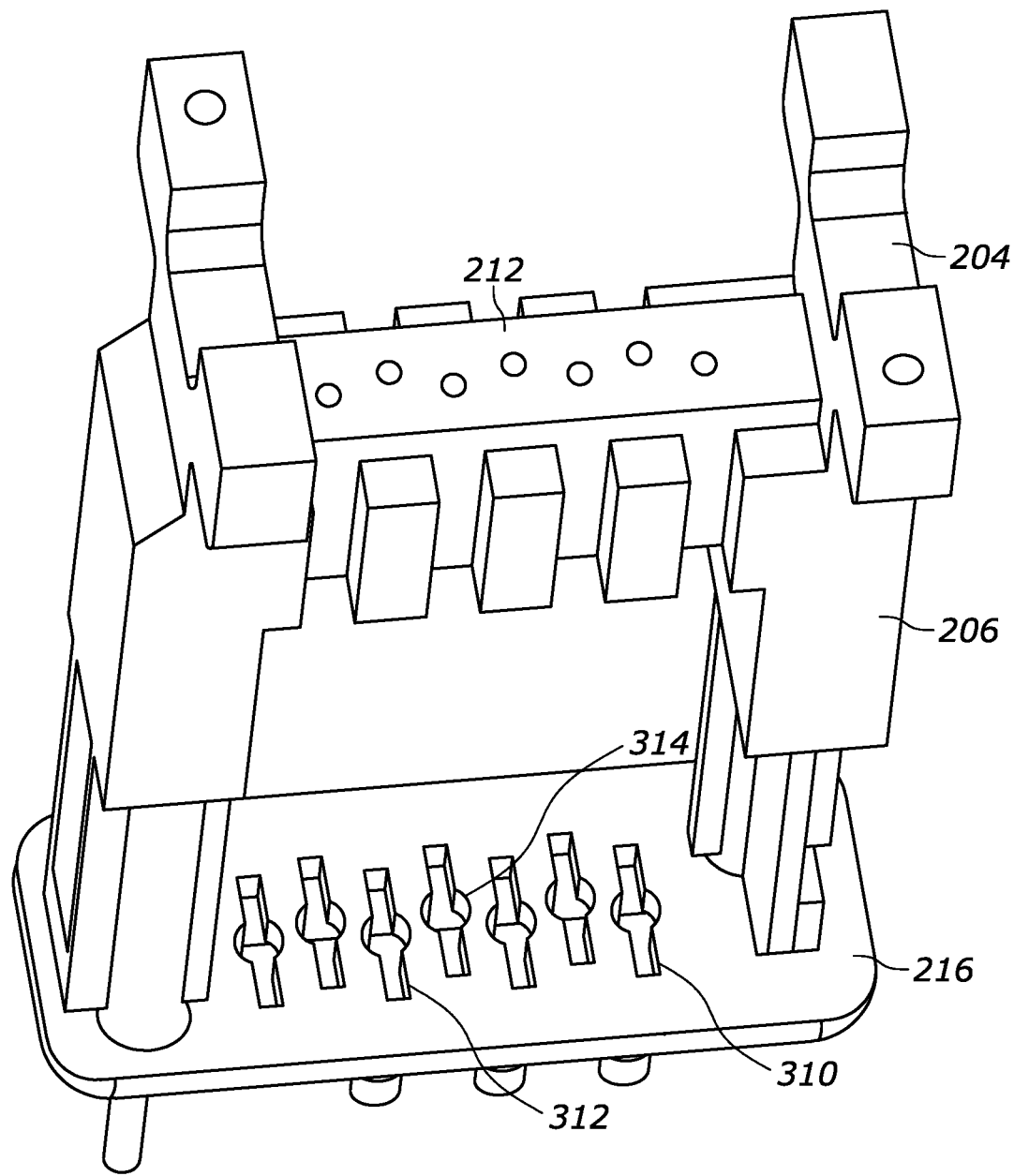
FIG. 13 is an isometric view of the housing and the end plate showing the slots that receive the lateral guides of the actuator rods of the first actuator assembly of FIG. 6.

FIG. 13 is an isometric view of the housing 204 and the end plate 216 showing the slots 310 that receive the lateral guides 308 of the actuator rods 226. The slots 310 in the implementation shown are staggered and include rectangular portions 312 that receive the lateral guides 308 and are positioned on either side of a circular central portion 314 that receive the plunger portions 244 of the actuator rods 226.

Figure 14:
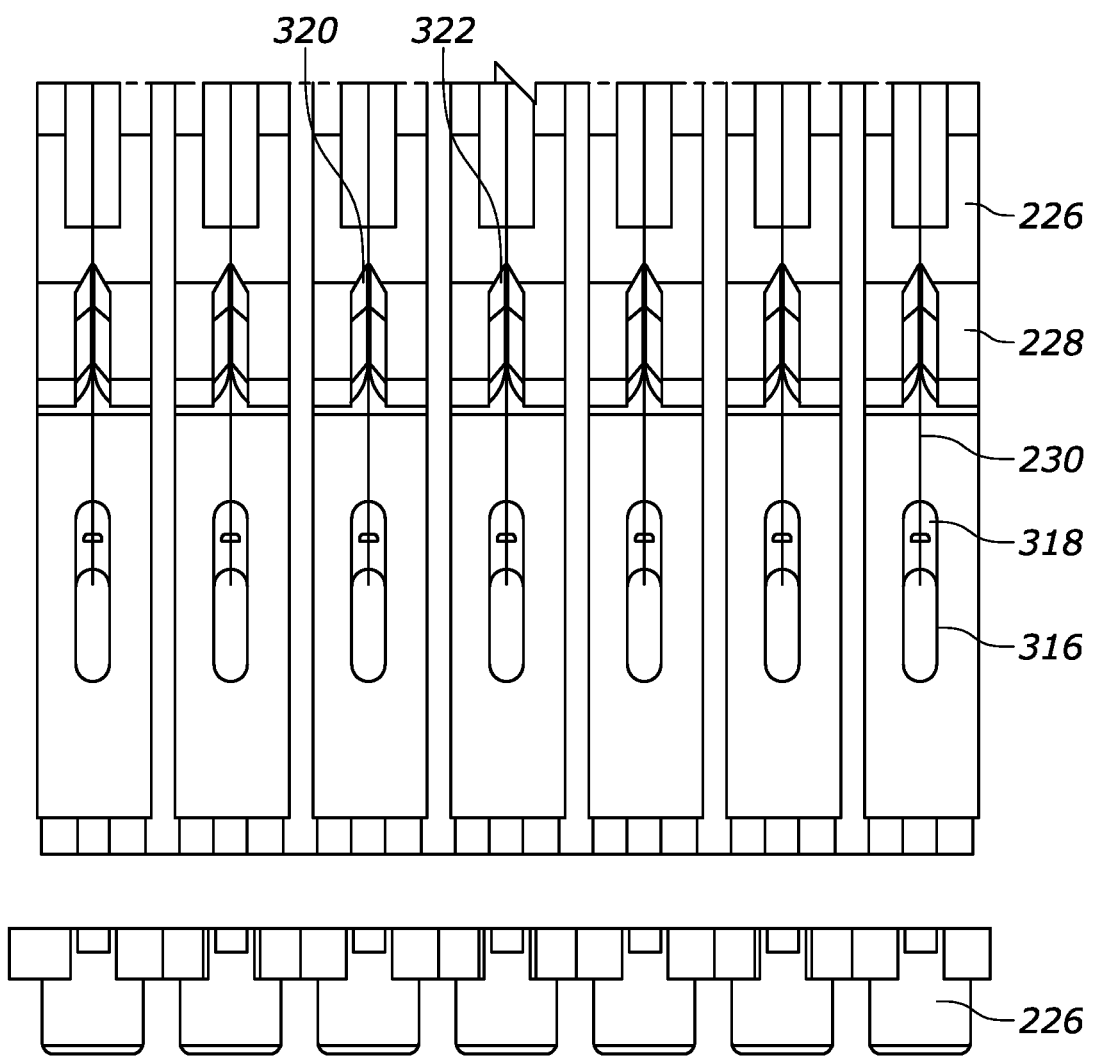
FIG. 14 is a side view of the actuator rods and the end plate of the first actuator assembly of FIG. 6.

FIG. 14 is a side view of the actuator rods 226 and the end plate 216 of the first actuator assembly 200 of FIG. 1. Each actuator rod 226 defines a transverse wire guide 316 through which a corresponding wire 230 extends in the implementation shown. The transverse wire guide 316 has a curved surface 318 against which the wire 230 engages to reduce wear. Each of the lateral wire guides 228 as also shown defines a slot 320 including a curved surface 322 against which the wire 230 engages to reduce wear.

Figure 15:
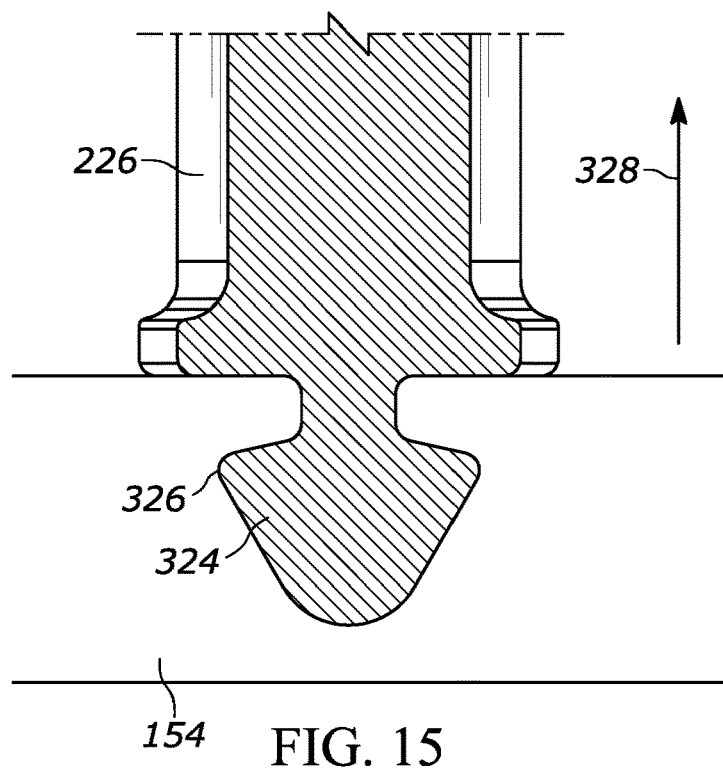
FIG. 15 is a cross-sectional expanded view of an alternative implementation of the membrane of the manifold assembly and the actuator rod of the first and/or second actuator assemblies of FIG. 5A or any of the disclosed implementations.

FIG. 15 is a cross-sectional expanded view of an alternative implementation of the membrane 154 of the manifold assembly 139 and the actuator rod 226 of FIG. 5A or any of the disclosed implementations. The actuator rod 226 is coupled to the membrane 154 in the implementation shown. The actuator rod 226 includes a male portion 324 and the membrane 154 includes a female portion 326. The female portion 326 is defined by an arrow shaped blind bore. The cross-section of the male portion 324 corresponds to the cross-section of the female portion 326.

The male portion 324 as shown is received by the female portion 326. A snap fit connection is formed between the actuator rod 226 and the membrane 154. When the actuator rod 226 is moved in a direction generally indicated by arrow 328, the coupling between the actuator rod 226 and the membrane 154 physically moves the membrane 154 in generally the same direction. The reagent may thus not be pressurized in some implementations and the actuator rod 226 can pull the membrane 154 away from the valve seat 158 such that a pump can push and/or pull reagent into the common fluidic line 136.

Figure 16:
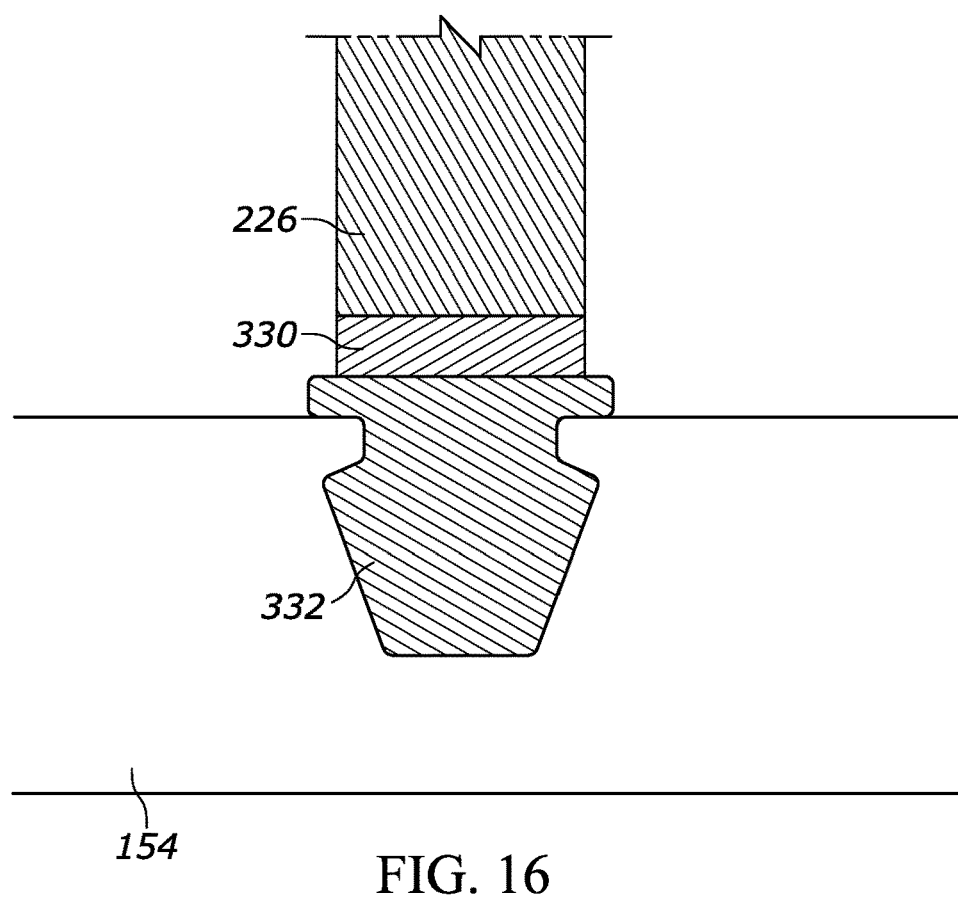
FIG. 16 is a cross-sectional expanded view of an alternative implementation of the membrane and the actuator rod of the first and/or second actuator assemblies of FIG. 5A or any of the disclosed implementations.

FIG. 16 is a cross-sectional expanded view of an alternative implementation of the membrane 154 and the actuator rod 226 of FIG. 5A or any of the disclosed implementations. The actuator rod 226 is coupled to the membrane 154 in the implementation shown. The actuator rod 226 includes a first magnet 330 and the male portion 324 includes a second magnet 332. The first magnet 330 is attracted to the second magnet 332 such that moving the actuator rod 226 correspondingly moves the membrane 154. As an alternative, one of the first magnet 330 or the second magnet 332 can be a magnet and the other can include a material (a ferromagnetic material) that is attracted to the magnet. The second magnet 332 in some implementations can be embedded and/or impregnated in the membrane 154.

Figure 17:
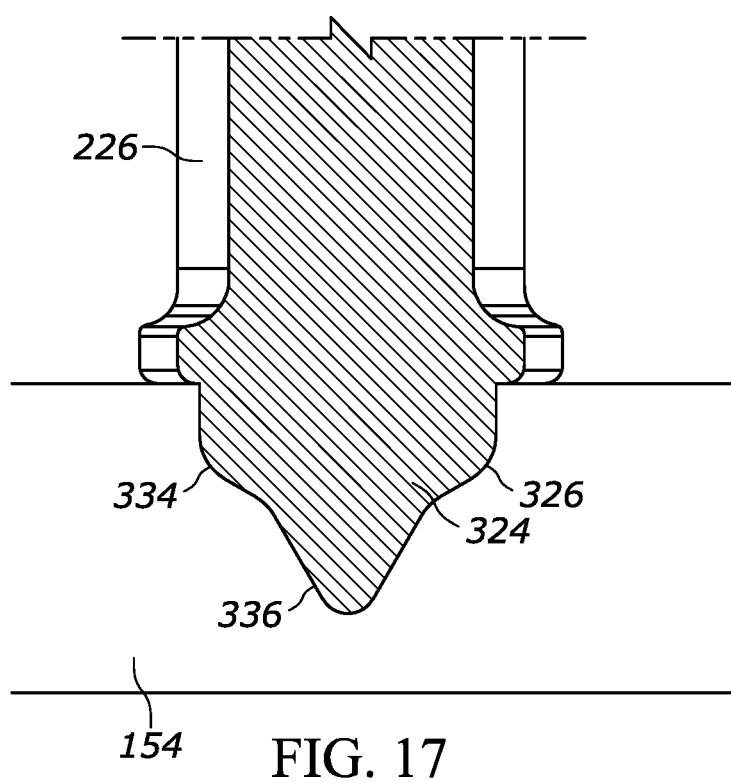
FIG. 17 is a cross-sectional expanded view of an alternative implementation of the membrane and the actuator rod of the first and/or second actuator assemblies of FIG. 5A or any of the disclosed implementations.

FIG. 17 is a cross-sectional expanded view of an alternative implementation of the membrane 154 and the actuator rod 226 that can be used to implement the actuators 218 of FIG. 5A or any of the actuators disclosed herein. The actuator rod 226 is coupled to the membrane 154 in the implementation shown. The actuator rod 226 includes the male portion 324 and the membrane 154 includes the female portion 326. In contrast to the implementation of FIG. 15, a snap fit connection is not formed when the male portion 324 is received by the female portion 326. The female portion 326 includes inwardly tapering sides 334 that correspond to inwardly tapering sides 336 of the male portion 324. The inwardly tapering sides 334, 336 meet at corresponding rounded ends.

Figure 18:
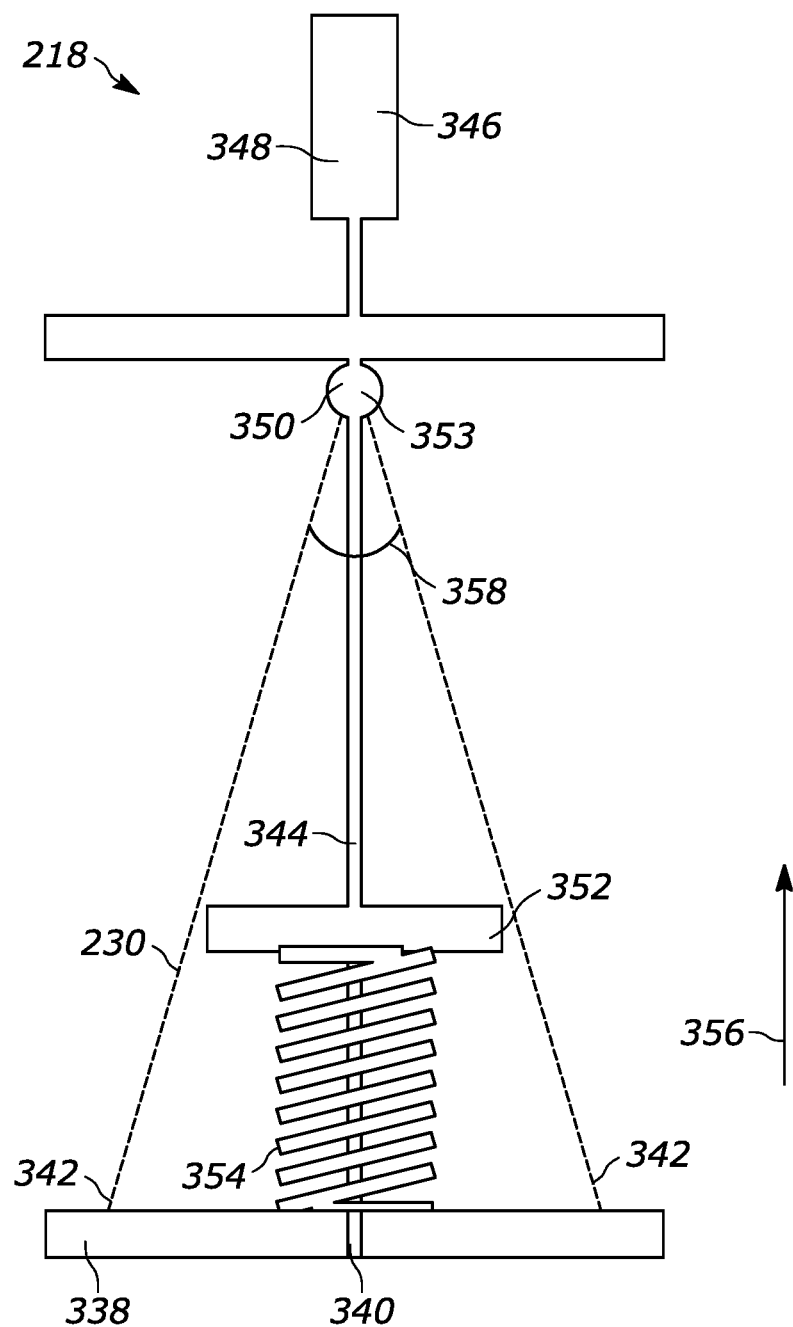
FIG. 18 illustrates a cross-sectional view of another example implementation of the shape memory alloy actuators in a first position that can be used to implement the actuators of FIG. 5A.
Figure 19:
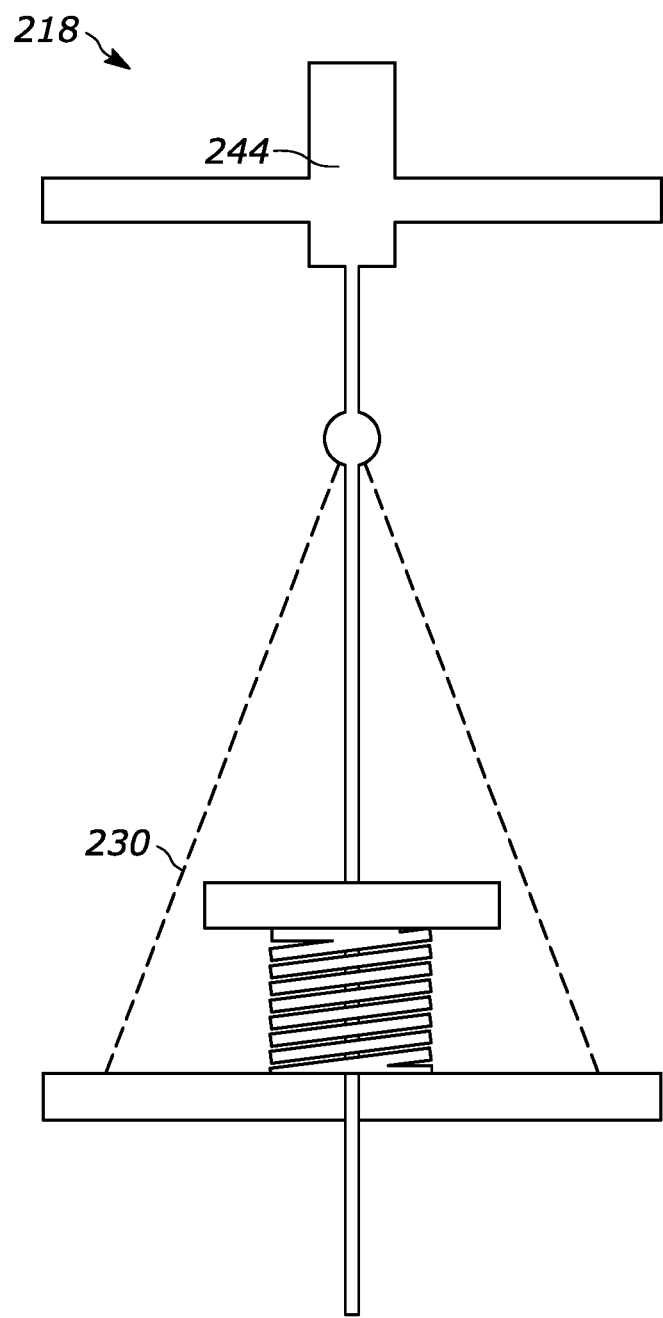
FIG. 19 illustrates a cross-sectional view of the shape memory alloy actuator of FIG. 18 in a second position.

FIGS. 18 and 19 illustrate cross-sectional views of another example implementation of the shape memory alloy actuators 218 that can be used to implement the actuators 218 of FIG. 5A or any of the actuators disclosed herein. In the implementation shown, the actuator 218 includes a guide 338 defining an aperture 340 and including wire mounts 342. The actuator 218 also includes an actuator rod 344 movable through the aperture 340 and including a plunger 346 at a distal end 348, a wire guide 350, and a spring seat 352. The wire guide 350 may be formed of a wear-resistant material 353 to increase the useful life of the actuator 218 by deterring the wire 230 from cutting into and/or otherwise wearing away the actuator rod 344. If the wire 230 cuts into the actuator rod 344, a length of the stroke of the actuator 218 may be reduced. The material 353 may be a rigid and insulating material and resistant to frictional wear.

A spring 354 is positioned between the guide 338 and the spring seat 352 and urges the actuator rod 344 in a direction generally indicated by arrow 356. A shape memory alloy wire 230 is coupled to the wire mounts 342 and positioned around the wire guides 350. To decrease the footprint of the actuator 218, an angle 358 at the interface with the wire guide 350 is relatively small. In practice and as shown in FIG. 19, the wire 230 retracts when voltage is applied thereto causing the actuator rod 344 to move between a first position and a second position and in a direction generally opposite that of arrow 356.

Figure 20:
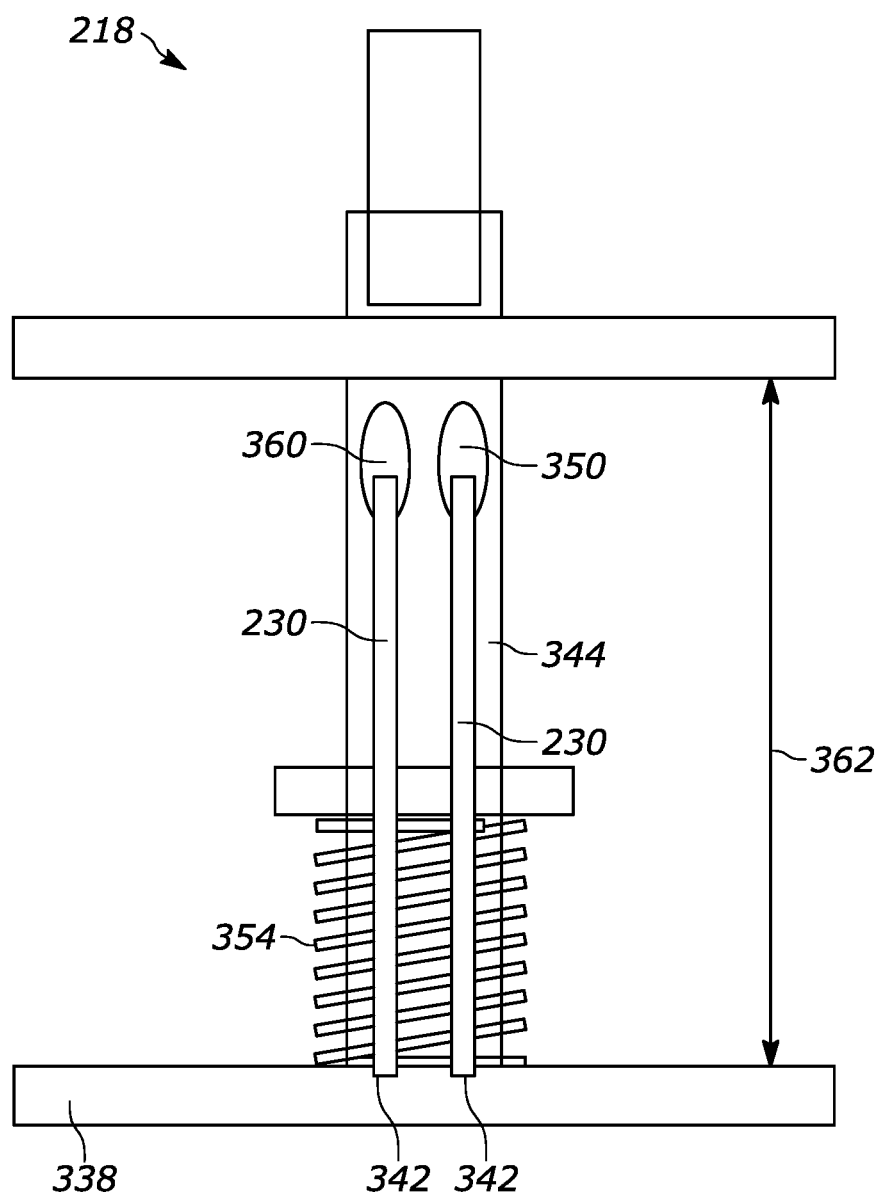
FIG. 20 illustrates a cross-sectional view of another example implementation of the shape memory alloy actuators that can be used to implement the actuators of FIG. 5A.

FIG. 20 illustrates a cross-sectional view of another example implementation of the shape memory alloy actuators 218 that can be used to implement the actuators 218 of FIG. 5A or any of the actuators disclosed. The actuator 218 is similar to the actuator 218 of FIGS. 18 and 19. However, in contrast, the actuator rod 34 includes a second wire guide 360 and a second shape memory alloy wire 230 is coupled to the wire mounts 342 and positioned around the second wire guide 360. Voltage is applied to the wire 230 sequentially in some implementations such that the voltage is applied to the first shape memory alloy wire 230 to actuate the actuator 218 when voltage is not applied to the second shape memory alloy wire 230 and voltage is applied to the second shape memory alloy wire 230 when voltage is not applied to the first shape memory alloy wire 230. The first wire 230 may be used for a first half of the useful life of the system 100 and the second wire 230 may be used for a second half of the useful life of the system 100. Put another way, voltage may no longer be applied to the first shape memory alloy wire 230 after a threshold amount of time, after a threshold number of cycles, or if the first shape memory alloy wire 230 is damaged and/or otherwise malfunctions. The system 100 may determine if the wire(s) 230 is functional by, for example, measuring the impedance of the wire(s) 230 and comparing the measured impedance value to a reference impedance value to determine if the measured impedance value is outside of a threshold of the reference impedance value indicative that the wire(s) 230 is no longer functioning properly.

When the second wire 230 is to be used, the first wire may be retired (no longer used) and/or burned away using excess current. Longer wires 230 have a longer useful life. However, by providing two or more wires 230 that are shorter as shown in FIG. 20, the same or a similar useful life of the actuator 218 can be achieved while decreasing a height 362 of the actuator 218. If the length of the wires 230 is increased, the useful life of each of the wires 230 may be proportionally increased. While two wires 230 are shown, any number of wires 230 may be included (e.g., 3, 4, 5, etc.). Certain implementations however may have limitations on the width of the actuator (amongst other limitations), thereby limiting the number of wires that may be placed next to each other for a single actuator. Moreover, while applying voltage to the wires 230 in sequence is mentioned, voltage may be applied to the wires 230 in parallel. Such an approach of applying voltage to both of the wires 230 at the same time may increase the force generated by each actuator 218 while enabling a length of the wires 230 to decrease and/or allowing a diameter of the wires 230 to decrease. Shorter wires and/or wires having a smaller diameter may cool faster and, thus, allow corresponding valves to be actuated faster.

Figure 21:
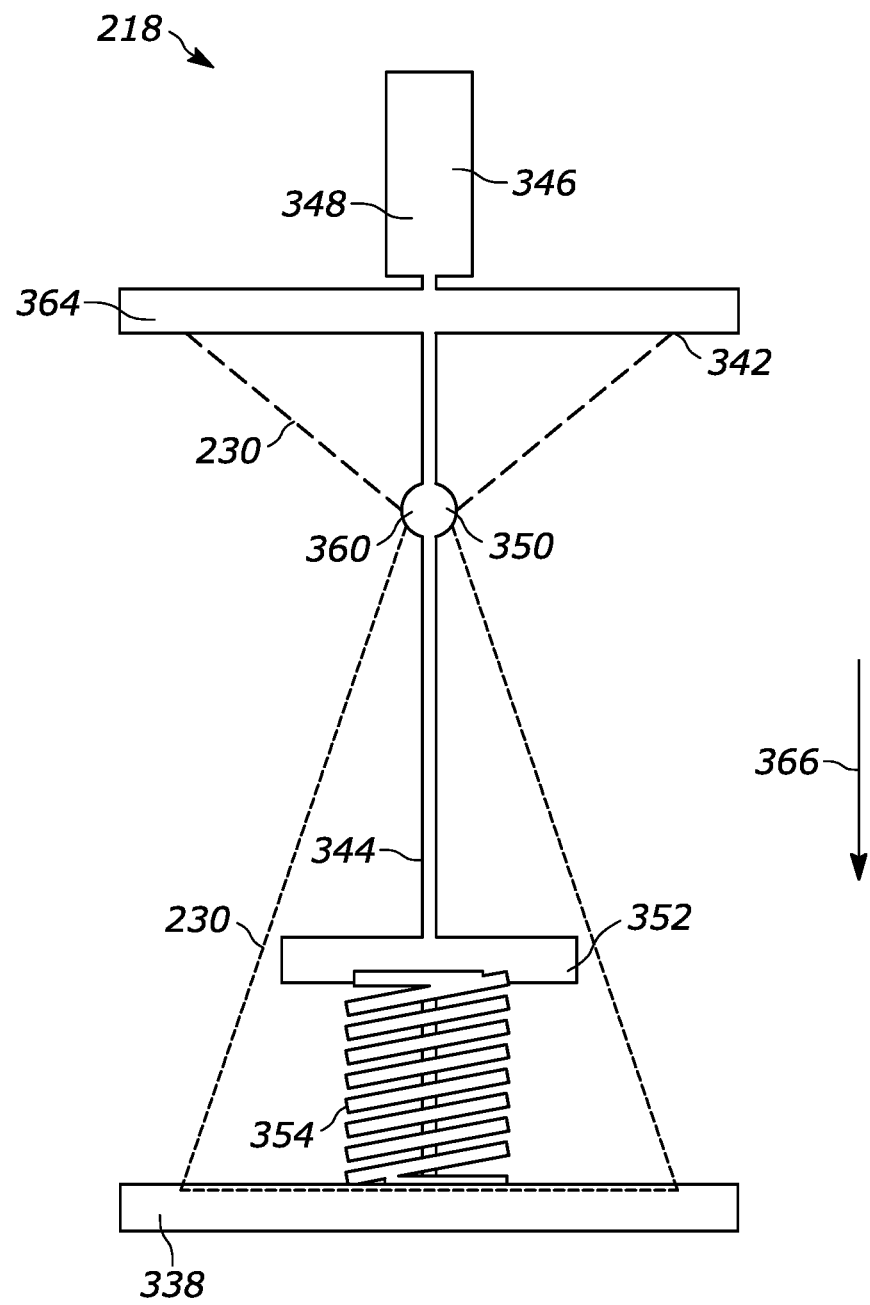
FIG. 21 illustrates a cross-sectional view of another example implementation of the shape memory alloy actuators that can be used to implement the actuators of FIG. 5A.

FIG. 21 illustrates a cross-sectional views of another example implementation of the shape memory alloy actuators 218 that can be used to implement the actuators 218 of FIG. 5A or any of the actuators disclosed. The actuator 218 of FIG. 21 is similar to the actuator 218 of FIG. 20. However, in contrast, the second wire 230 is coupled to wire mounts 342 of a second guide 364. Applying the voltage to the first wire 230 advantageously retracts the first wire 230 and causes the actuator rod 344 to move between the first position and the second position and in a direction generally indicated by arrow 366 and applying a voltage to the second shape memory alloy wire 230 retracts the second shape memory alloy wire 230 and causes the actuator rod 344 to move between the second position and the first position and in a direction generally opposite that of arrow 366. Using a second wire 230, as shown in FIG. 21, may reduce the time for the actuator 218 to return to the first position and, thus, reduce the time to actuate (open and/or close) the associated membrane valve 144. Put another way, the secondary wire 230 assists the spring 354 to close the associated membrane valve 144 faster.

Figure 22:
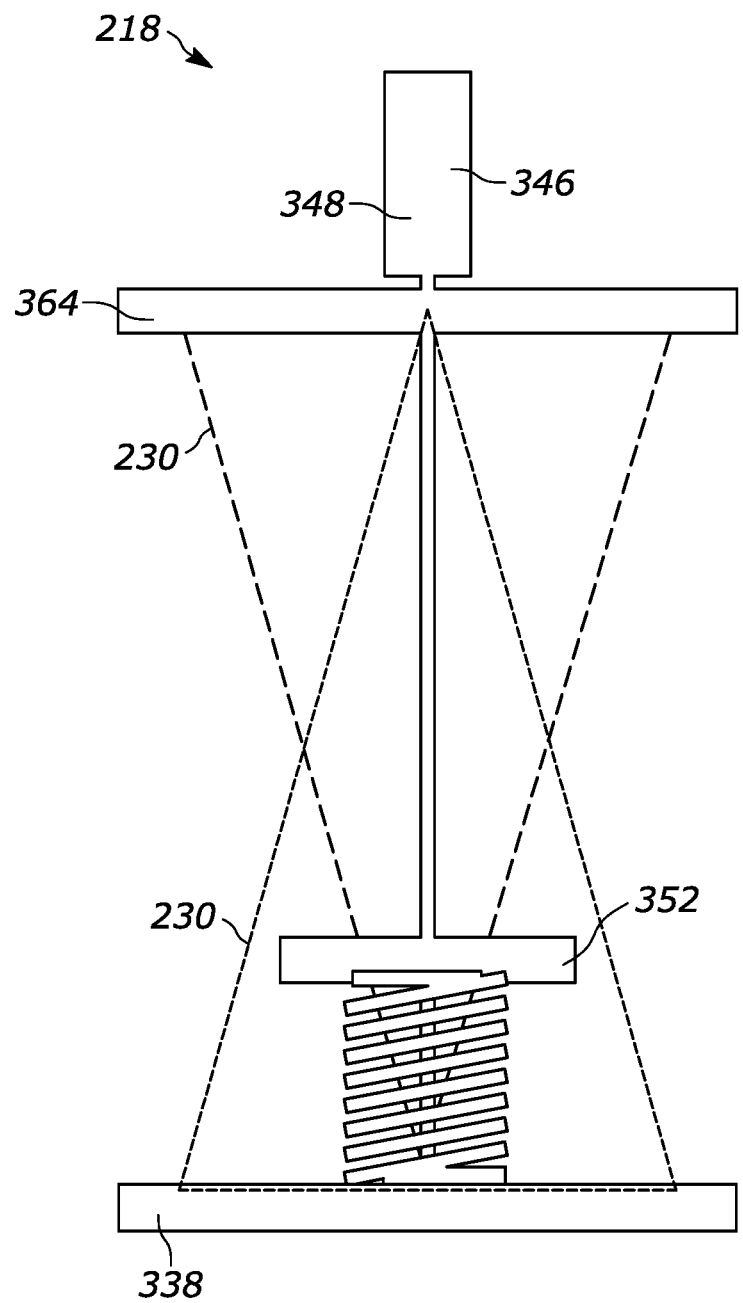
FIG. 22 illustrates a cross-sectional view of another example implementation of the shape memory alloy actuators that can be used to implement the actuators of FIG. 5A.

FIG. 22 illustrates a cross-sectional view of another example implementation of the shape memory alloy actuators 218 that can be used to implement the actuators 218 of FIG. 5A or any of the actuators disclosed. The actuator 218 of FIG. 22 is similar to the actuator 218 of FIG. 21. However, in contrast, the first wire 230 is coupled to a first wire guide 350 and the second wire 230 is coupled to a second wire guide 350 spaced from the first wire guide 350. The first wire guide 350 is positioned toward a distal end of the actuator rod 226 and the second wire guide 350 is positioned toward a proximal end of the actuator rod 226 such that the wires 230 cross one another but do not touch, thereby enabling a profile of the actuator 218 to be reduced. Moreover, in the implementation shown, the first and second wires 230 are approximately the same length or at least the second wire 230 is longer than the second wire 230 of FIG. 21.

Figure 23:
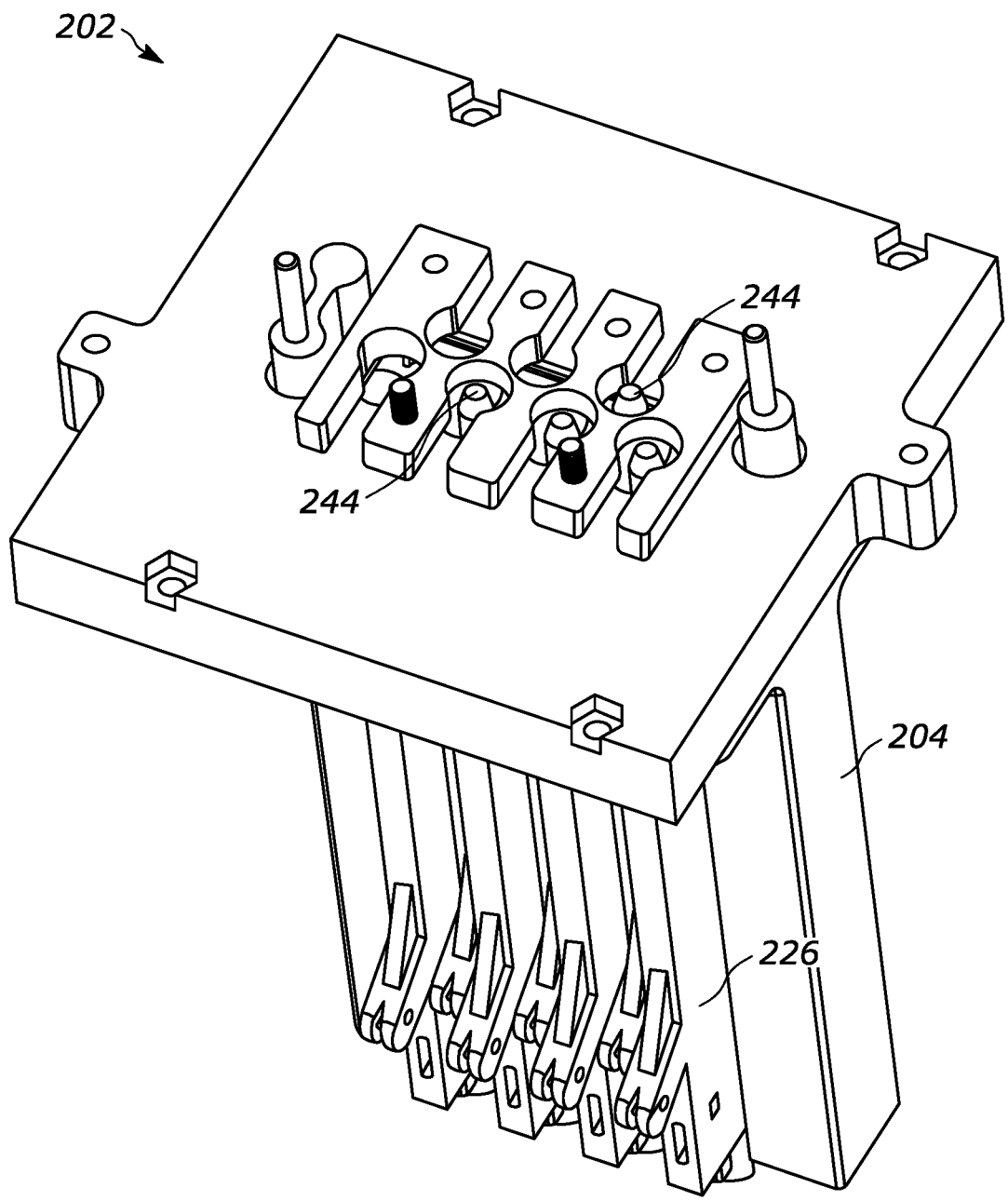
FIG. 23 illustrates an isometric view of the second actuator assembly of FIG. 6 showing plunger portions of the actuator rods extending through a printed circuit board and being actuatable to interface with an associated manifold assembly.

FIG. 23 illustrates an isometric view of the second actuator assembly 202 of the valve drive assembly 118 of FIG. 6 showing plunger portions 244 of the actuator rods 226 extending through a printed circuit board 214 and being actuatable to interface with an associated manifold assembly 139.

Figure 24:
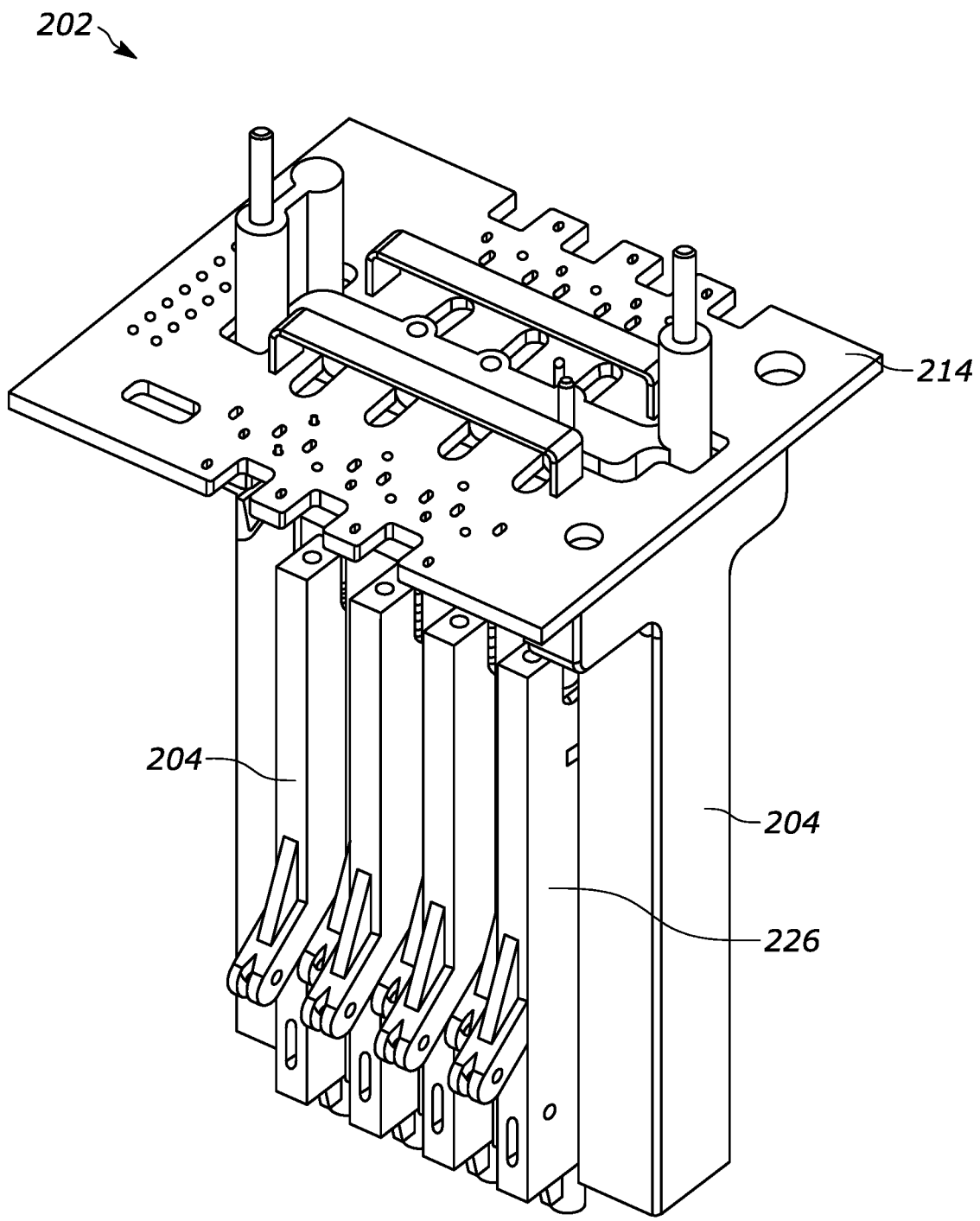
FIG. 24 illustrates another isometric view of the second actuator assembly of FIG. 6 showing a housing, a plurality of actuator rods, and a circuit board.

FIG. 24 illustrates another isometric view of the second actuator assembly 202 of FIG. 6 showing a housing 204, a plurality of actuator rods 226, and a printed circuit board 214.

Figure 25:
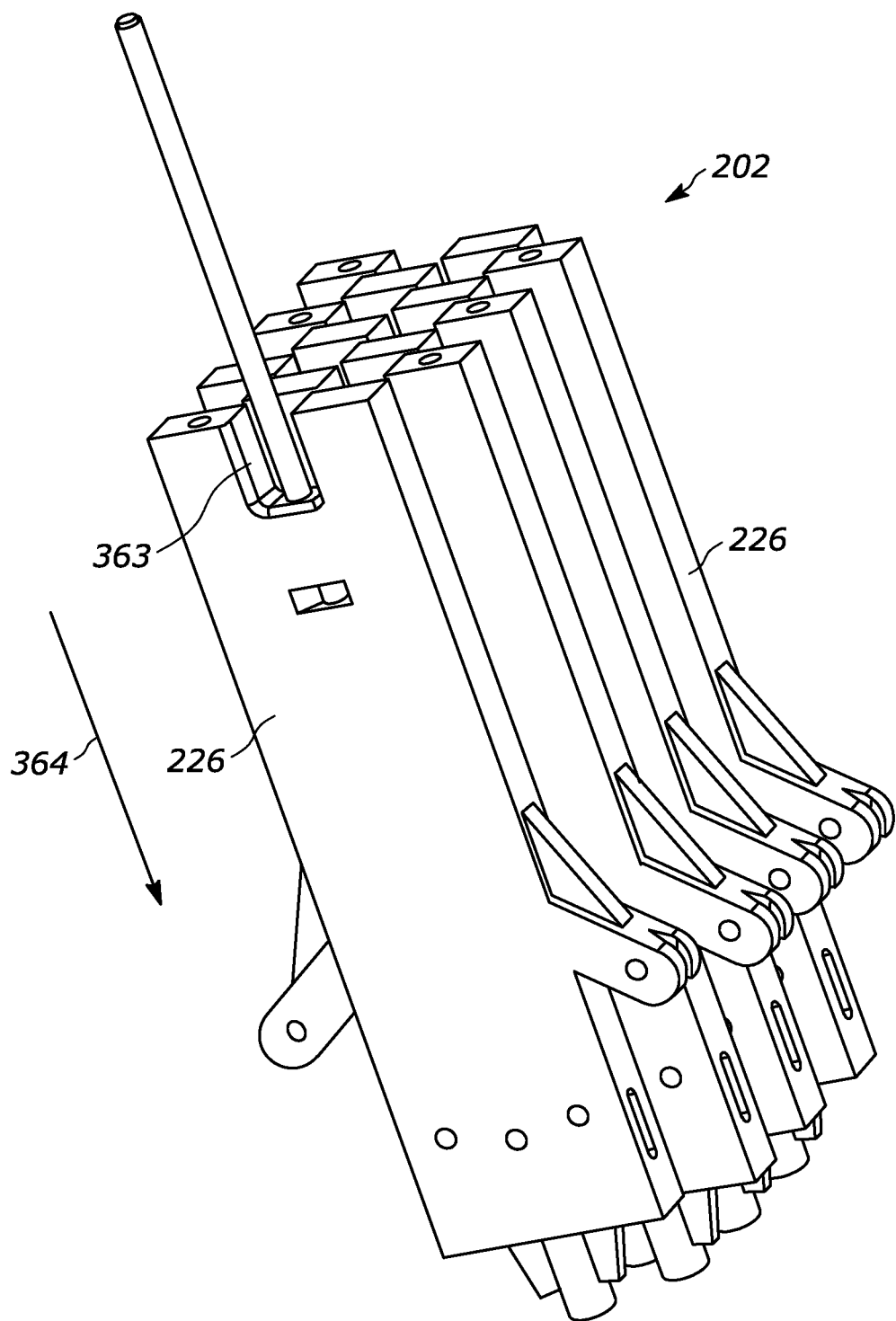
FIG. 25 illustrates another isometric view of a plurality of actuator rods including spring seats of the second actuator assembly of FIG. 6.

FIG. 25 illustrates another isometric view of a plurality of actuator rods 226 including spring seats 363 of the second actuator assembly 202 of FIG. 6. Springs such as coil springs may be seated within the spring seat 363 and positioned to act against the printed circuit board 214 and urge the actuator rods 226 in a direction generally indicated by arrow 364.

Figure 26:
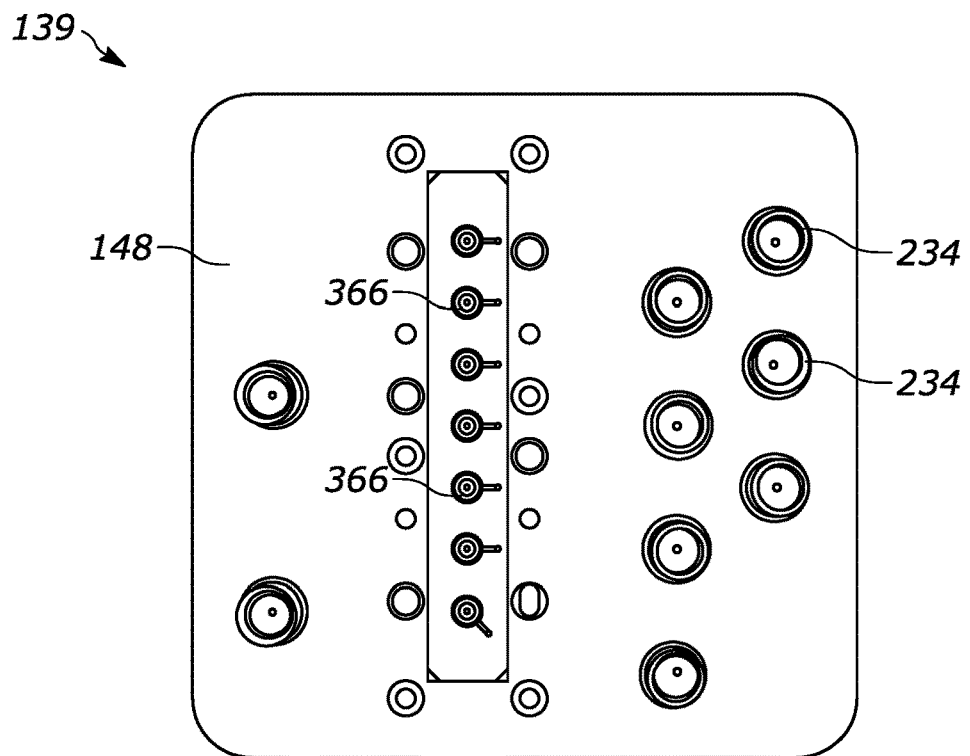
FIG. 26 is a top view of another example implementation of the manifold assembly of FIG. 1.
Figure 27:
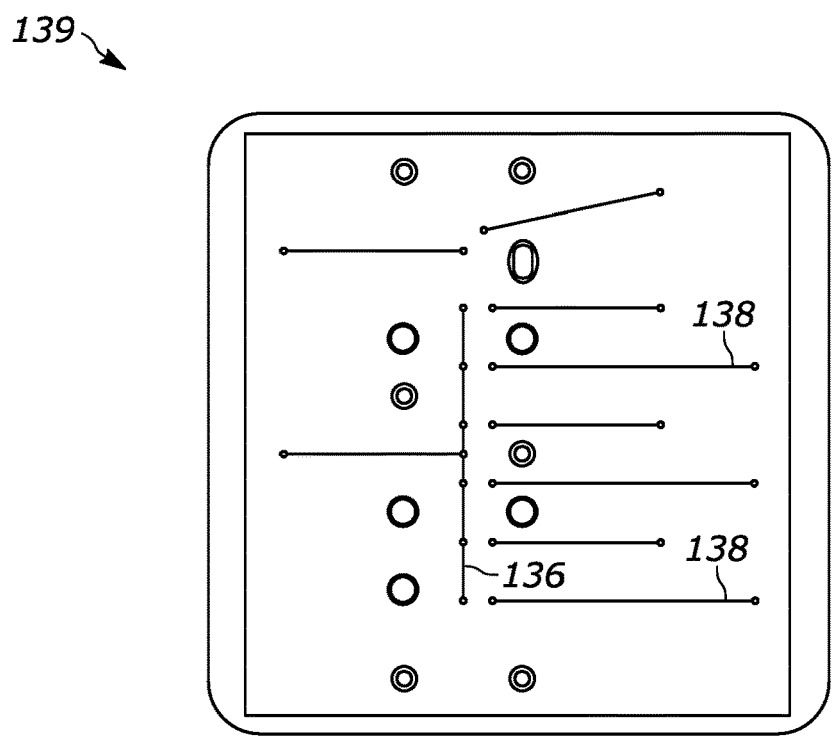
FIG. 27 is a bottom view of the manifold assembly of FIG. 26.

FIGS. 26 and 27 are top and bottom views of another example implementation of the manifold assembly 139 of FIG. 1. In contrast to the manifold assembly 139 of FIG. 4, the manifold assembly 139 of FIGS. 24 and 25 include volcano valves 366.

Figure 28:
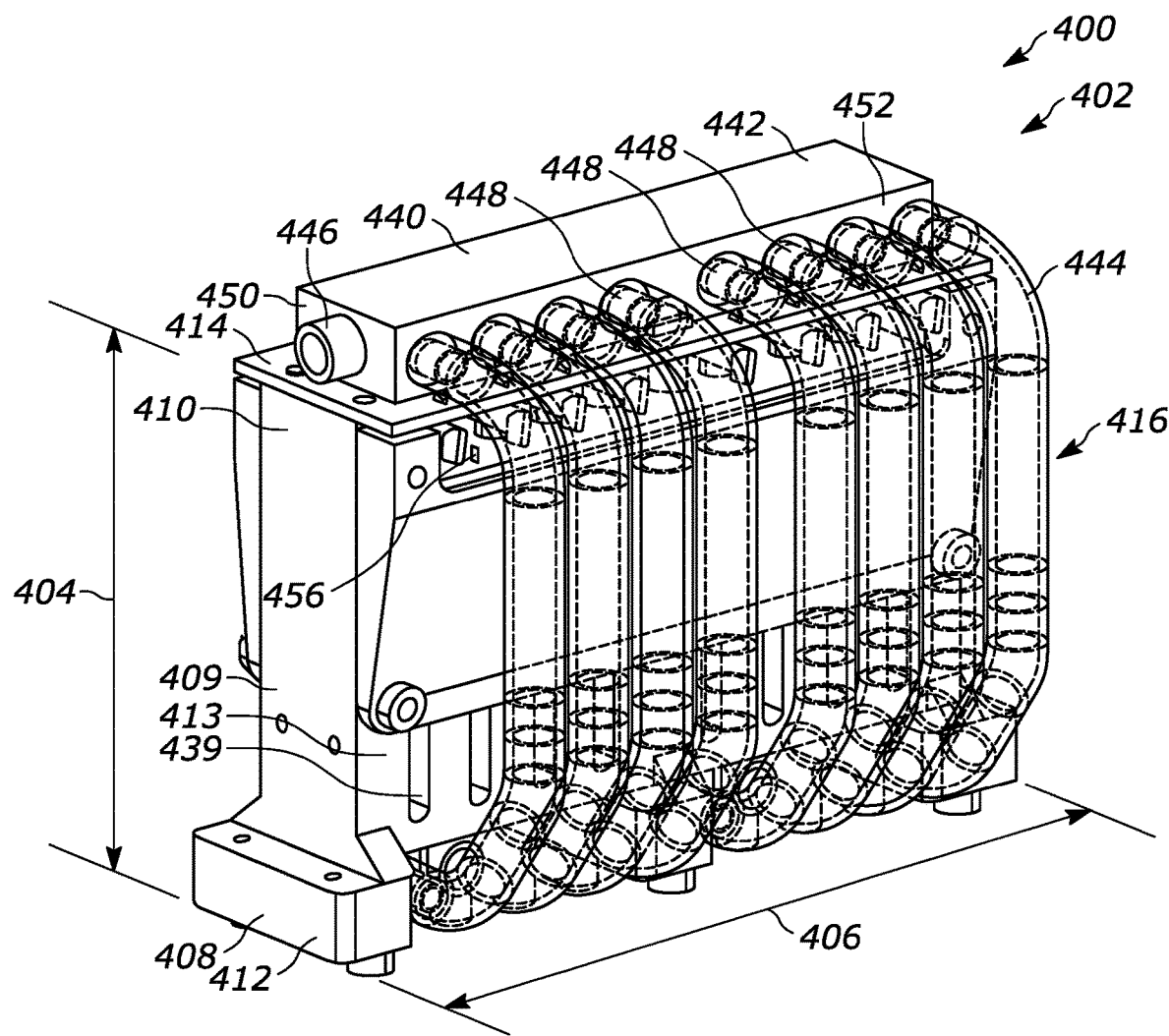
FIG. 28 is an isometric view of an example valve drive assembly that can be used to implement the valve drive assembly of FIGS. 1, 2, and 3

FIG. 28 is an isometric view of an example valve drive assembly 400 that can be used to implement the valve drive assembly 118 of FIGS. 1, 2, and 3. In the implementation shown, the valve drive assembly 400 includes a shape memory alloy actuator assembly 402 that can interface with the membrane valves 144 of the manifold assembly 139 of FIG. 1. The valve drive assembly 400 may have a height 404 of approximately 56 millimeters (mm) and a length 406 of approximately 76 mm. However, the valve drive assembly 400 may have different dimensions.

The actuator assembly 402 includes a housing 408 including a pair of lateral sides 409 each having a first end 410 and a second end 412 and a transverse section 413 coupling the lateral sides 206. The housing 204 may be a H-shaped frame and the lateral sides 409 may be lateral walls of the H-shaped frame. While the housing 408 is shown as a frame, the housing 408 may include one or more solid blocks or pieces of material that define actuator rod bores. The actuator assembly 500 also includes a printed circuit board 414 coupled to the first end 410 of the housing 408.

Figure 29:
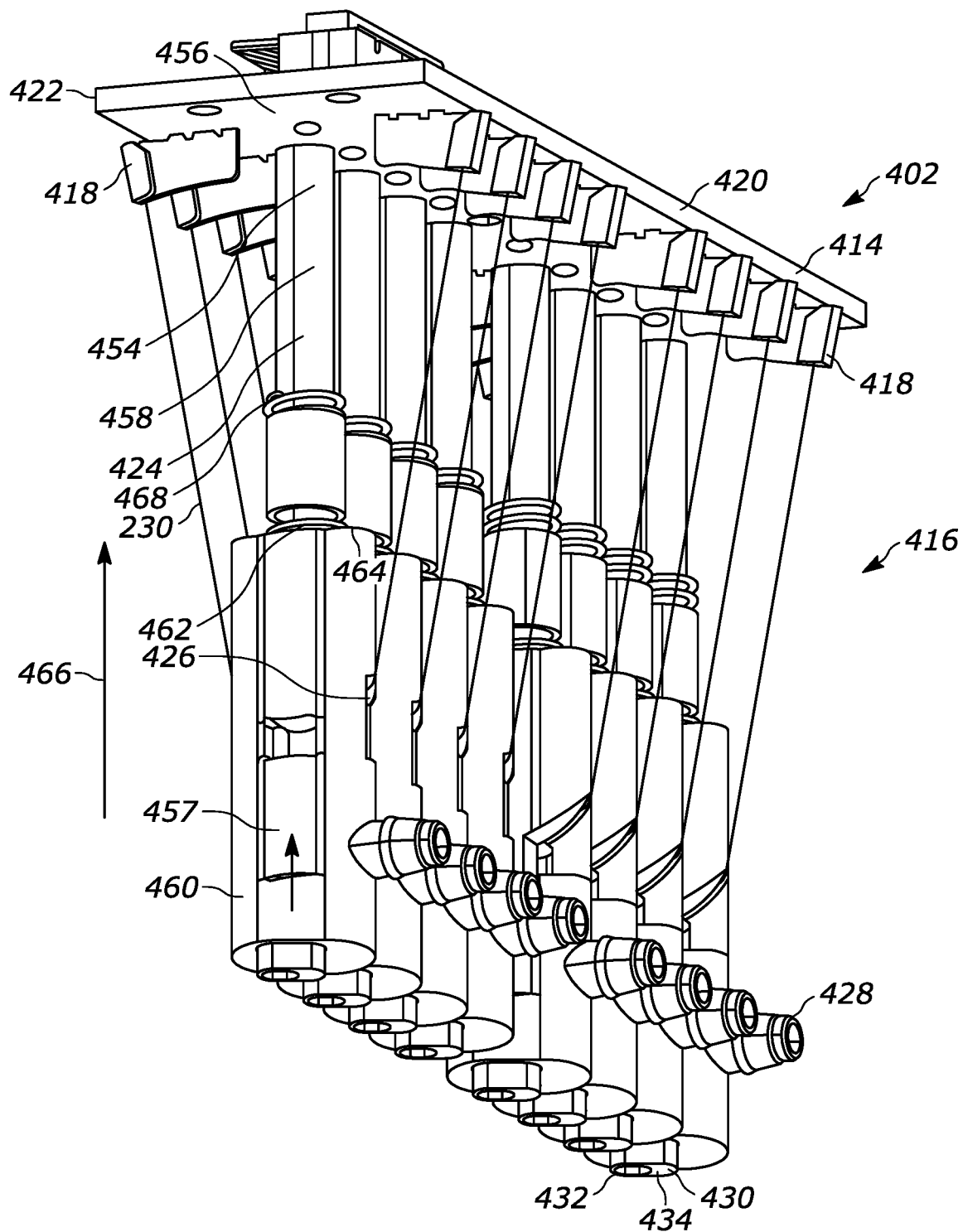
FIG. 29 is an isometric view of the printed circuit board and a plurality of shape memory alloy actuators of the actuator assembly of FIG. 28.

FIG. 29 is an isometric view of the printed circuit board 414 and a plurality of shape memory alloy actuators 416 of the actuator assembly 402 of FIG. 28. Each shape memory alloy actuator 416 includes a pair of wire mounts 418 coupled to opposing sides 420, 422 of the printed circuit board 414 and an actuator rod 424 including a wire guide 426. Each of the actuator rods 424 includes a side port 428 and an end face 430 having a vacuum port 432 fluidically coupled to the side port 428 and a plunger portion 434 that can be used to close a corresponding membrane valve 144 by urging the membrane 154 against the valve seat 158.

Referring back to FIG. 28, the housing 408 of the actuator assembly 402 includes slots 439 that allow the wires 230 of the actuators 416 to pass there through. The actuator assembly 402 also has an actuator manifold assembly 440 coupled to the printed circuit board 414 and including a body 442 and a plurality of pneumatic lines 444. The body 442 has an outlet port 446 and a plurality of inlet ports 448. The out port 446 is positioned at an end 450 of the body 442 and the inlet ports 448 are positioned on a side 452 of the body 442. The pneumatic lines 444 are coupled between the side ports 428 of the actuator rods 424 and the inlet ports 448 of the actuator manifold assembly 440. The pneumatic lines 444 may be flexible fluidic lines to allow the pneumatic lines 444 to move based on relative movement between the actuator rods 424 and the body 442 of the actuator manifold assembly 440.

A pump such as the pump 166 of the system 100 of FIG. 1 can be connected to the outlet port 446 and used to create a vacuum that draws air through the vacuum ports 432 and the side ports 428 of the corresponding actuators 416, through the inlet ports 448 of the actuator manifold assembly 440, and out of the outlet port 446. The vacuum created at the vacuum ports 432 allows the vacuum ports 448 to sealingly engage the membrane 154 of the membrane valves 144 and move the membrane 154 away from the valve seat 158 based on corresponding movement of the actuator rod 424.

Each actuator rod 424 carries a target 454 (See, FIG. 29) and the housing 408 and/or the printed circuit board 414 carries a sensor 456 for each target 454. The target 454 may be magnetic (e.g., a magnet or a ferromagnetic material) and the senor 456 may be a Hall-Effect sensor that can be used to determine a stroke distance of the corresponding actuator rod 424, thereby allowing the actuator 416 to control a stroke of the actuator rod 424. The stroke may be between around 0.1 μm and around 100 μm or another distance. While the actuator rod 424 is mentioned carrying the target 454 and the housing 408 and/or the printed circuit board 414 is mentioned carrying the sensor 456, the actuator rod 424 can carry the sensor 456 and the housing 408 and/or the printed circuit board 414 can carry the target 454. Each of the actuator rods 424 may additionally or alternatively include the sensor 456 and the corresponding membrane valve 144 can include a target 454, thereby allowing the relative position between the end face 430 and the membrane 154 to be determined. Responsive to a distance between the sensor 556 carried by the actuator rod 424 and the target 454 carried by the membrane valve 144 being greater than a threshold value, the actuator 416 can cause the actuator rod 424 to move toward the membrane 154 and for the vacuum port 432 of the corresponding actuator 416 to sealing engage the membrane 154 in such implementations. Using the sensors 557 to monitor a relative relationship between the actuator rods 424 and the membrane valves 144 allows the actuators 416 and/or the corresponding system 100 to determine when a sealing connection is no longer present between the actuator rod 424 and the membrane 154.

Referring to FIG. 29, each actuator rod 424 includes a portion 458 and a movable portion 460 that has a bore 462 receives the portion 458 and defines a spring seat 464. The movable portion 460 may be used as a valve plug having the plunger portion 434 that selectively engages the membrane 154 of the corresponding membrane valve 144 to close the membrane valve 144. The actuator rod 424 interacts with surfaces of the movable portion 460 to guide movement of the movable portion 460 in a direction generally indicated by arrow 466 and between the first position and the second position. A biasing element 468 surrounds each of the actuator rods 424 and biases the corresponding actuator rod 424 in a direction generally opposite the direction generally indicated by arrow 466.

Figure 30:
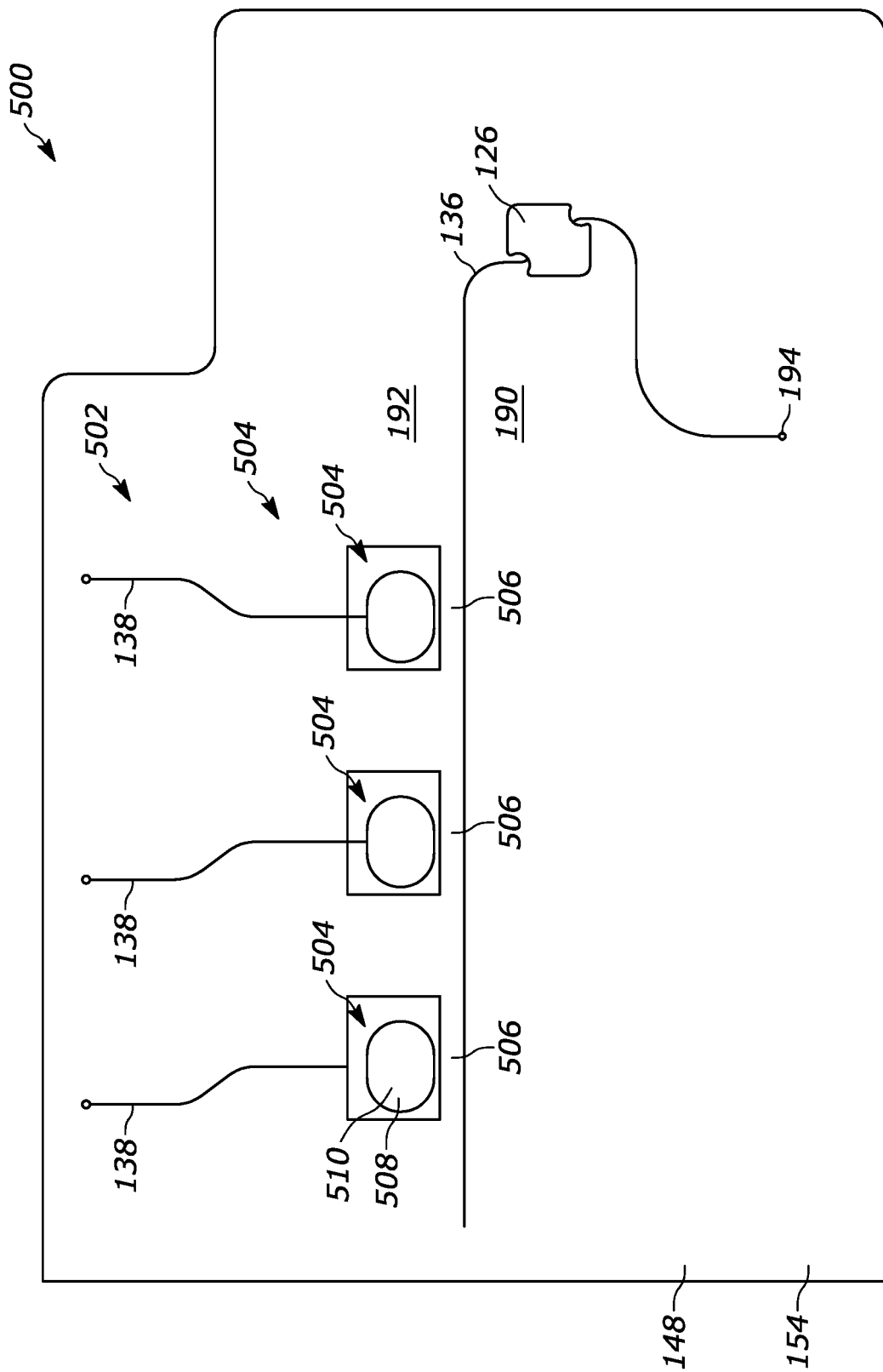
FIG. 30 is a top view of an example flow cell assembly including a manifold assembly and a flow cell that can be used to implement the flow cell assembly of FIG. 1.

FIG. 30 is a top view of an example flow cell assembly 500 including a manifold assembly 502 and the flow cell 126 that can be used to implement the flow cell assembly 106 of FIG. 1. The manifold assembly 502 includes membrane valves 504 that are formed by the manifold body 148 and the membrane 154 that is coupled to a surface of the manifold body 148. The membrane valves 504 support high flow rate and reduce impedance to 0.01 psi/min/mL, for example. For each membrane valve 504, the manifold body 148 includes a valve seat 506 and defines a chamber 508 that is fluidically coupled to the reagent fluidic line 138 and positioned between the reagent fluidic line 138 and the valve seat 506. A portion 510 of the membrane 154 covers the chamber 508. The chamber 508 and the portion 510 of the membrane 154 have a width greater than a width of the valve seat 506 in the implementation shown.

The width of the chamber 508 and the portion 510 increase the surface area of the chamber 508 and the portion 510, allows a greater force to be exerted onto the membrane 154, and significantly reduce a cracking pressure when the actuators 416 open the corresponding membrane valve 504. The cracking pressure may between about 0.4 pound per square inch (psi) and about 1.2 psi and, specially, about 0.45 psi, about 0.54 psi, about 0.74 psi, about 0.75 psi, about 0.77 psi, about 1.1 psi, about 1.12 psi, about 1.2 psi, for example.

The chamber 508 and the portion 510 are shown being squircle shaped, tear-drop shaped, etc. Other shapes for the chamber 508 and the portion 510 are suitable to achieve the reduced cracking pressure such as, for example, oblong shaped, triangularly shaped, circular shaped, diamond shaped, stadium shaped, and/or other shapes that encourage flushing of the chamber 508 such as shapes with rounded corners.

The membrane valves 504 can be opened by the vacuum ports 432 of the corresponding actuators 416 sealingly engaging the portion 510 of the membrane 154 and the actuator rods 424 moving between the first position and the second position. The membrane valves 504 can be closed by the plunger portions 434 of the corresponding actuators 416 moving the membrane 154 from the second position to the first position and urging the membrane into engagement with the valve seat 506.

Figure 31:
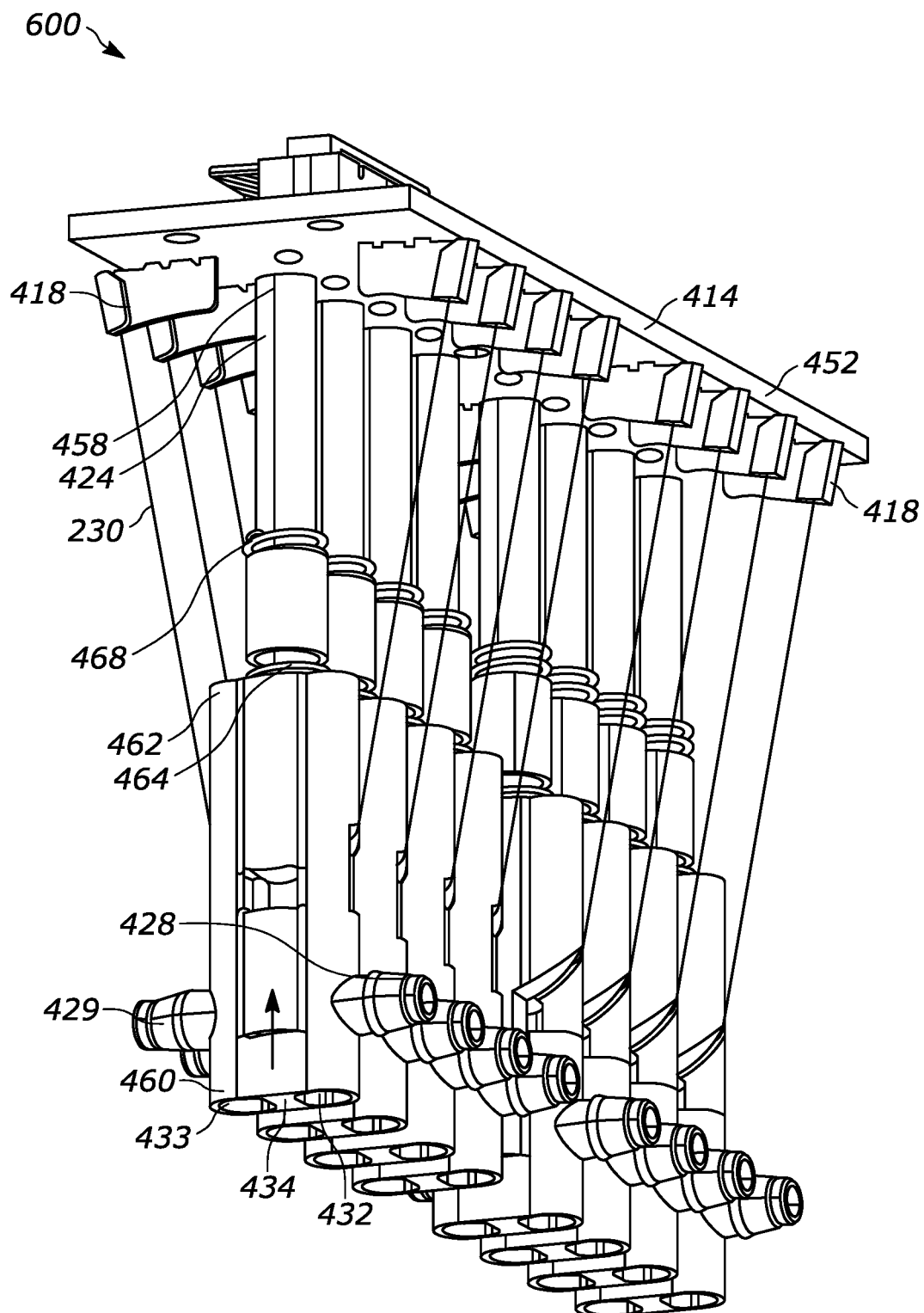
FIG. 31 is an isometric view of a portion of an example valve drive assembly that can be used to implement the valve drive assembly of FIGS. 1, 2, and 3.

FIG. 31 is an isometric view of a portion of an example valve drive assembly 600 that can be used to implement the valve drive assembly 118 of FIGS. 1, 2, and 3. The valve drive assembly 600 of FIG. 31 is similar to the valve drive assembly 400 of FIG. 28. However, in contrast, each of the actuator rods 424 includes first and second side ports 428, 429 and the end face 430 of the actuator rods 424 has first and second vacuum ports 432, 433 fluidically coupled to the corresponding side port 428, 429. The plunger portion 434 is positioned between the first and second vacuum ports 432, 433.

Figure 32:
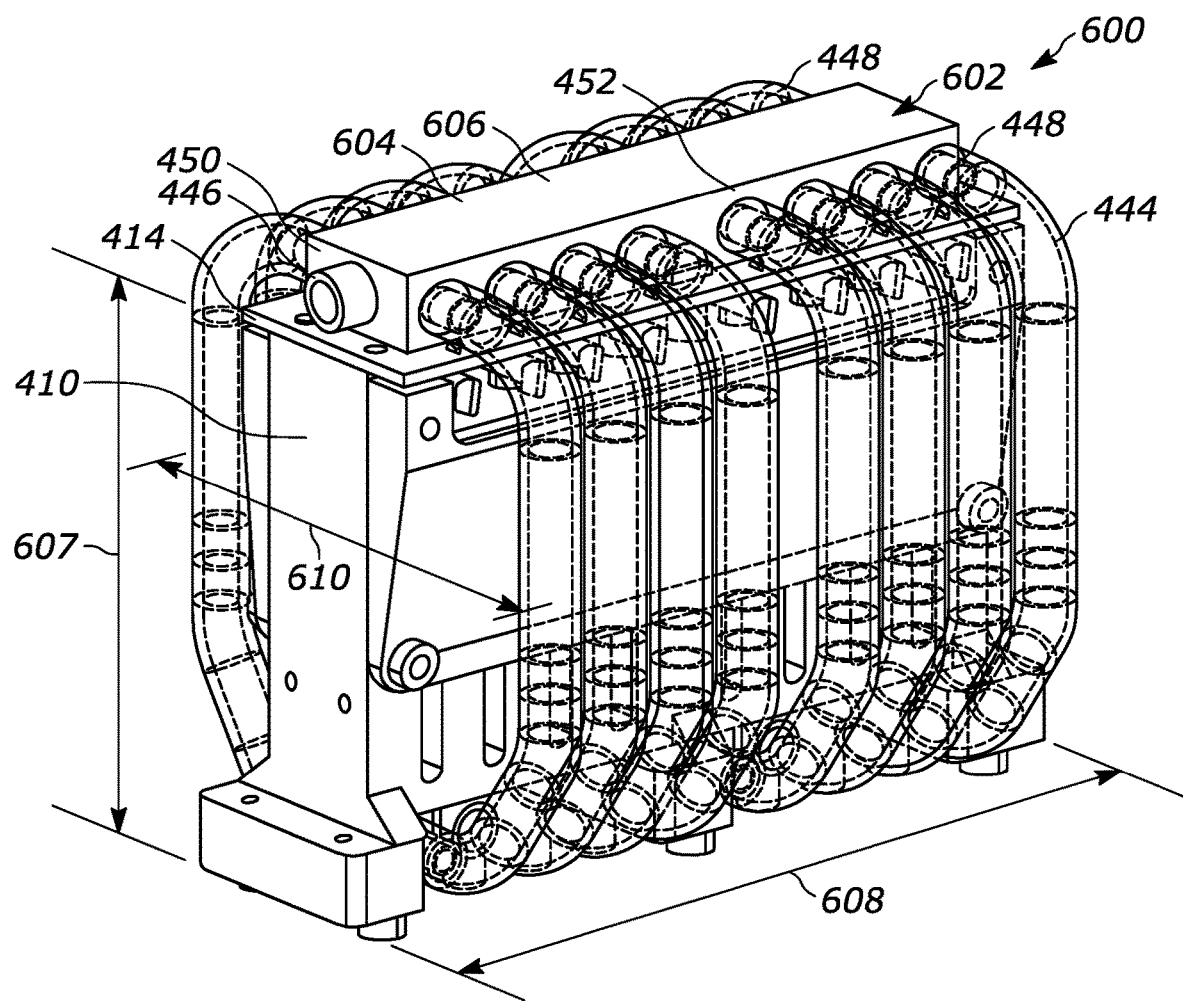
FIG. 32 is an isometric view of the valve drive assembly of FIG. 31 including an actuator manifold assembly coupled to the printed circuit board and including a body and fluidic lines.

FIG. 32 is an isometric view of the valve drive assembly 600 of FIG. 31 including an actuator manifold assembly 602 coupled to the printed circuit board 414 and including a body 604 and the pneumatic lines 444. The body 604 has the outlet port 446 positioned at the end 450 of the body 604 and inlet ports 448 positioned on sides 452, 606 of the body 442. The pneumatic lines 444 are coupled between the side ports 428 of the actuator rods 424 and corresponding inlet ports 448 of the actuator manifold assembly 440. The valve drive assembly 600 may have a height 607 of approximately 56 millimeters (mm), a length 608 of approximately 76 mm, and a width 610 of approximately 55 mm. The valve drive assembly 600 however may have different dimensions.

Figure 33:
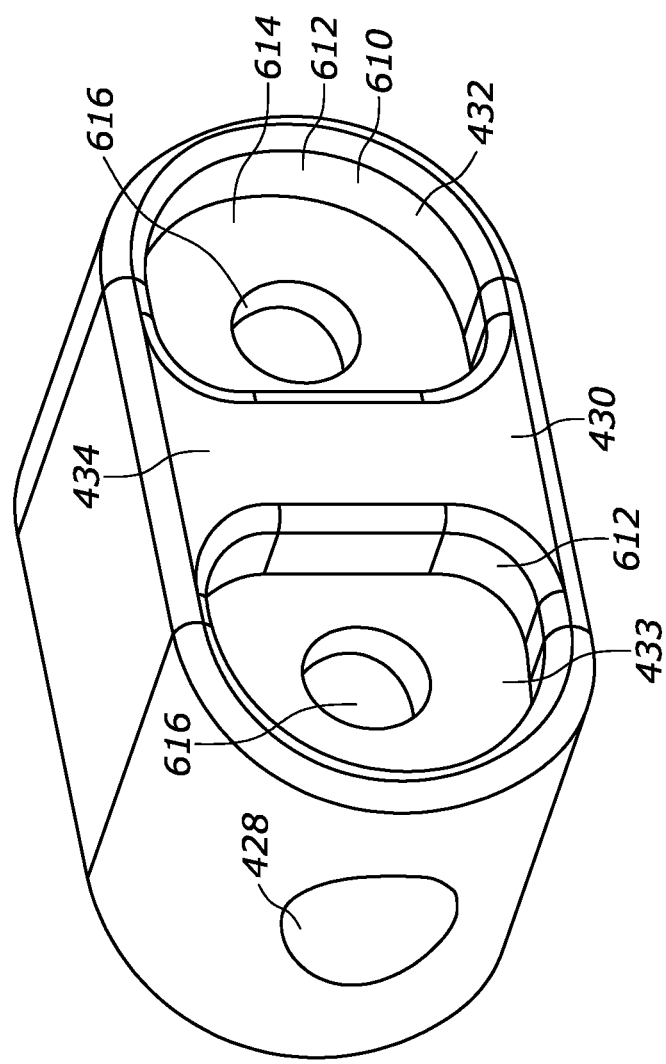
FIG. 33 is a detailed view of the end face of one of the actuator rods including the first and second vacuum ports with the plunger portion positioned between the vacuum ports 432.

FIG. 33 is a detailed view of end face 430 of one of the actuator rods 226 including the first and second vacuum ports 432, 433 with the plunger portion 434 positioned between the vacuum ports 432. Each of the vacuum ports 432, 433 in the implementation shown include a receptacle 610 defined by a side wall 612 and a base 614 having an aperture 616 that allows the vacuum ports 432, 433 to be fluidically coupled to the corresponding side port 428. The receptacle 610 allows the vacuum ports 432, 433 to apply a greater vacuum force on the membrane 154 of the membrane valves 144 and, thus, allows the membrane 154 to be more easily moved by the actuators 416 away from the valve seat 158. The receptacles 610 may alternatively be omitted and the bases 614 and the apertures 616 may be placed immediately adjacent and/or in engagement with the membrane 154 of the membrane valves 144.

Figure 34:
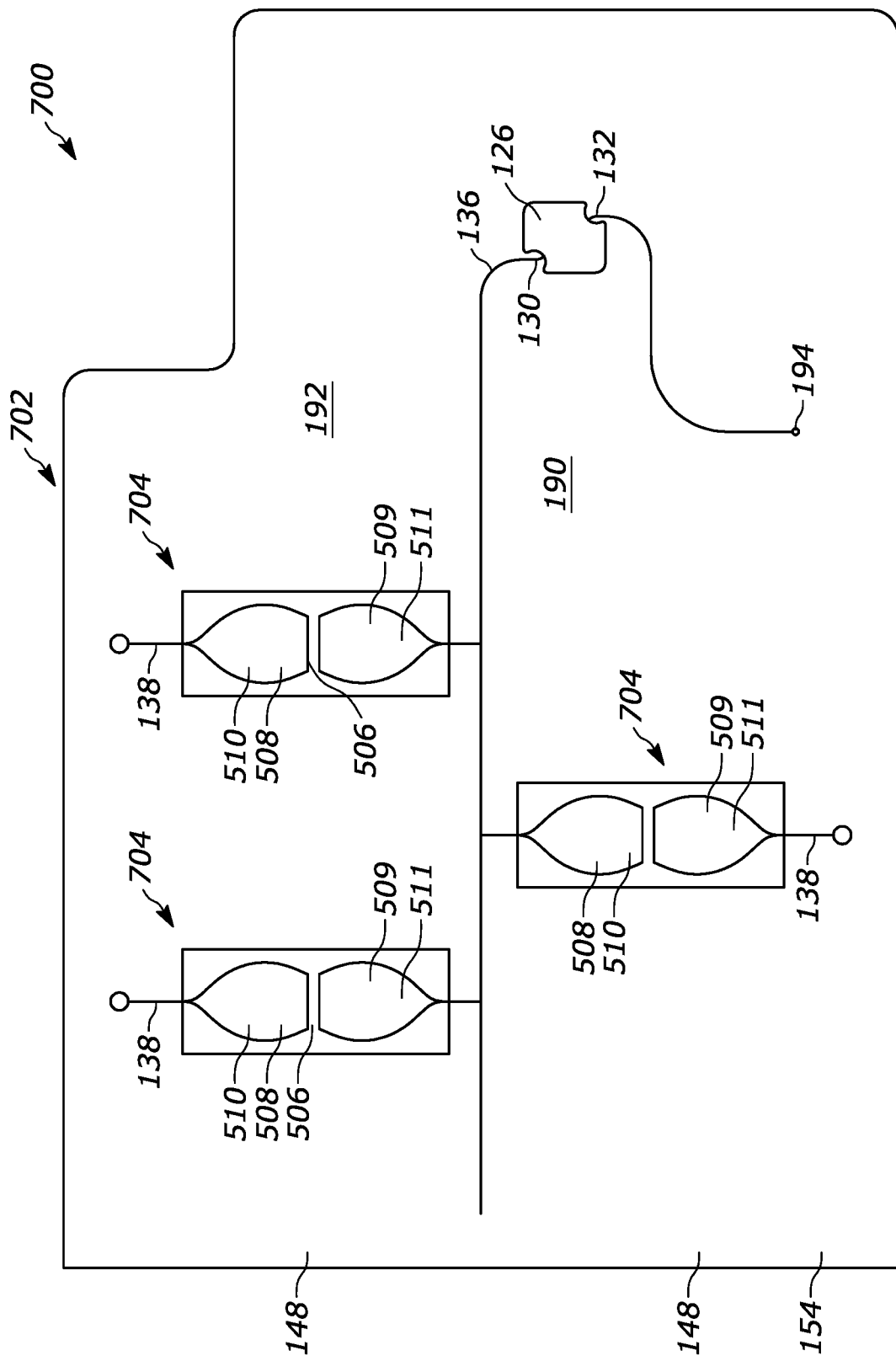
FIG. 34 is a top view of an example flow cell assembly including a manifold assembly and a flow cell that can be used to implement the flow cell assembly of FIG. 1.

FIG. 34 is a top view of an example flow cell assembly 700 including a manifold assembly 702 and the flow cell 126 that can be used to implement the flow cell assembly 106 of FIG. 1. The manifold assembly 702 includes membrane valves 704 that are similar to the membrane valves 504 of the manifold assembly 502 of FIG. 30. In contrast to the membrane valves 504 of the manifold assembly 502 of FIG. 30, each of the membrane valves 704 includes first and second chambers 508, 509 and first and second portions 510, 511 of the membrane 154 that cover the first and second chambers 508, 509. The membrane valves 504 support high flow rate and bi-directional flow and reduce impedance. The valve seat 506 is positioned between the first chamber 508 and the second chamber 509.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. An apparatus, comprising:
a system including a valve drive assembly including plurality of shape memory alloy actuators; and
a flow cell assembly comprising a flow cell inlet, a flow cell outlet, a flow cell, and a manifold assembly, the manifold assembly, comprising:
a common fluidic line having a first side and a second side, the flow cell being coupled to the common fluidic line;
a plurality of reagent fluidic lines disposed on the second side of the common fluidic line; and
a plurality of membrane valves selectively fluidically coupling the common fluidic line and a corresponding one of the plurality of reagent fluidic lines,
wherein each shape memory alloy actuator corresponds to one of the membrane valves and is actuatable to selectively control a flow of reagent between each of the reagent fluidic lines and the common fluidic line.

2. The apparatus of claim 1, wherein the membrane valves are volcano valves.

3. The apparatus of claim 1, wherein each shape memory alloy actuator includes a plunger, a spring that biases the plunger, and a shape memory alloy wire.

4. The apparatus of claim 3, wherein actuating the shape memory alloy actuator comprises the system causing a voltage to be applied to the shape memory alloy wire that retracts the plunger against a force of the spring.

5. The apparatus of claim 1, wherein each of the shape memory alloy actuators comprise a pair of shape memory alloy wires and wherein actuating the shape memory alloy actuator comprises the system causing a voltage to be applied to a first one of the shape memory alloy wires and the system not applying the voltage to a second one of the shape memory alloy wires.

6. An apparatus, comprising:
a shape-memory alloy actuator comprising:
a guide defining an aperture and including wire mounts;
an actuator rod movable through the aperture and including a plunger at a distal end, a first wire guide, a second wire guide, and a spring seat;
a spring positioned between the guide and the spring seat;
a first shape memory alloy wire coupled to the wire mounts and positioned around the first wire guide; and
a second shape memory alloy wire coupled to the wire mounts and positioned around the second wire guide,
wherein applying a voltage to the first shape memory alloy wire retracts the shape memory alloy wire and causes the actuator rod to move between a first position and a second position.

7. The apparatus of claim 6, wherein the voltage is applied to the first shape memory alloy wire to actuate the shape-memory alloy actuator when voltage is not applied to the second shape memory alloy wire.

8. The apparatus of claim 7, further comprising applying a voltage to the second shape memory alloy wire when voltage is not applied to the first shape memory alloy wire.

9. The apparatus of claim 8, wherein the voltage is not applied to the first shape memory alloy wire after a threshold amount of time, after a threshold number of cycles, or if the first shape memory alloy wire is damaged.

10. The apparatus of claim 6, further comprising a second guide having wire mounts and the second shape memory alloy wire coupled to the wire mounts of the second guide and positioned around the second wire guide.

11. The apparatus of claim 10, wherein applying the voltage to the first shape memory alloy wire retracts the first shape memory alloy wire and causes the actuator rod to move between the first position and the second position and applying a voltage to the second shape memory alloy wire retracts the second shape memory alloy wire and causes the actuator rod to move between the second position and the first position.

12. The apparatus of claim 6, further comprising a fan positioned to flow air toward the shape-memory alloy actuator.

13. An apparatus, comprising:
a shape memory alloy actuator assembly, comprising:
a housing comprising a pair of lateral sides each having a first end and a second end and a transverse section coupling the lateral sides;
a printed circuit board coupled to the first end of the housing;
a plurality of shape memory alloy actuators positioned between the printed circuit board and the second end, each shape memory alloy actuator comprising:
a pair of wire mounts coupled to opposing sides of the printed circuit board;
an actuator rod positioned between the lateral sides of the housing and including a wire guide, the actuator rod comprising a side port and an end face having a vacuum port and a plunger portion, the side port being fluidically coupled to the vacuum port;
a sensor or a target carried by the actuator rod; and
a shape memory alloy wire coupled to the wire mounts and positioned around the wire guide; and
an actuator manifold assembly coupled to the printed circuit board, the actuator manifold assembly comprising:
a body having an outlet port and a plurality of inlet ports; and
a plurality of pneumatic lines, each pneumatic line coupled between the side port of one of the actuator rods and one of the inlet ports of the actuator manifold assembly;
wherein applying a voltage to the shape memory alloy wire retracts the shape memory alloy wire and causes the corresponding actuator rod to move between a first position and a second position.

14. The apparatus of any one of claim 13, wherein the housing carries the other of the sensor or the target.

15. The apparatus of claim 13, wherein each membrane valve carries the other of the sensor or the target.

16. The apparatus of claim 15, wherein responsive to a distance between the sensor and the target being greater than a threshold value, the shape memory alloy actuator causes the actuator rod to move toward a portion of a membrane of the membrane valve and for the vacuum port of the corresponding shape memory actuator to sealingly engage the portion of the membrane.

17. The apparatus of claim 15, wherein closing the membrane valves includes the plunger portion of the corresponding shape memory actuator moving a membrane of the membrane valve from the second position to the first position and urging the membrane into engagement with a valve seat of the membrane valve.

18. The apparatus of claim 13, wherein the actuator rods comprise a second side port and the end face has a second vacuum port, the plunger portion positioned between the vacuum port and the second vacuum port.

19. The apparatus of claim 15, wherein each membrane valve defines a second chamber covered by a second portion of the membrane, a valve seat of the membrane valve positioned between the chamber and the second chamber.

20. The apparatus of claim 19, wherein opening the membrane valves further includes a second vacuum port of the corresponding shape memory actuator sealingly engages the second portion of the membrane and moving between the first position and the second position.

21. The apparatus of claim 13, wherein the pneumatic lines of the actuator manifold assembly are coupled between a second side port of the actuator rods and corresponding inlet ports of the actuator manifold assembly.

* * * * *

UNITED STATES PATENT AND TRADEMARK OFFICE
CERTIFICATE OF CORRECTION

| | | |
|---|---|---|
| PATENT NO. | : 11,821,411 B2 | Page 1 of 1 |
| APPLICATION NO. | : 18/087274 | |
| DATED | : November 21, 2023 | |
| INVENTOR(S) | : Schoch et al. | |

It is certified that error appears in the above-identified patent and that said Letters Patent is hereby corrected as shown below:

In the Claims

In Claim 14, delete "The apparatus of any one of claim 13," and insert -- The apparatus of claim 13, --.

Signed and Sealed this
Twenty-seventh Day of February, 2024

Katherine Kelly Vidal
Director of the United States Patent and Trademark Office